US011908219B2

(12) United States Patent
Ni et al.

(10) Patent No.: US 11,908,219 B2
(45) Date of Patent: Feb. 20, 2024

(54) METHOD AND DEVICE FOR PROCESSING INFORMATION, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Zihan Ni, Beijing (CN); Yipeng Sun, Beijing (CN); Kun Yao, Beijing (CN); Junyu Han, Beijing (CN); Errui Ding, Beijing (CN); Jingtuo Liu, Beijing (CN); Haifeng Wang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 385 days.

(21) Appl. No.: 17/244,291

(22) Filed: Apr. 29, 2021

(65) Prior Publication Data
US 2021/0271870 A1      Sep. 2, 2021

(30) Foreign Application Priority Data
Sep. 29, 2020  (CN) .......................... 202011057666.2

(51) Int. Cl.
*G06V 30/413*         (2022.01)
*G06F 40/30*          (2020.01)
(Continued)

(52) U.S. Cl.
CPC ............ *G06V 30/413* (2022.01); *G06F 40/30* (2020.01); *G06V 10/70* (2022.01); *G06V 30/414* (2022.01)

(58) Field of Classification Search
CPC ................................ G06F 40/30; G06V 10/70
See application file for complete search history.

(56) References Cited

U.S. PATENT DOCUMENTS 10,706,450 B1 * 7/2020 Tavernier ............ G06F 16/9535
10,880,614 B2 * 12/2020 Favicchio ............ H04N 21/466
(Continued)

FOREIGN PATENT DOCUMENTS

CN       108764226 A       11/2018
CN       109582933 A       4/2019
(Continued)

OTHER PUBLICATIONS

Office Action issued in Chinese Application No. 202011057666.2, dated Mar. 8, 2022 (15 pages).
(Continued)

*Primary Examiner* — Kevin Ky
(74) *Attorney, Agent, or Firm* — Osha Bergman Watanabe & Burton LLP

(57) ABSTRACT

The disclosure provides a method and a device for processing information, an electronic device, and a storage medium, belonging to a field of artificial intelligence including computer vision, deep learning, and natural language processing. In the method, the computing device recognizes multiple text items in the image. The computing device classifies multiple text items into a first set of name text items and a second set of content text items based on semantics of the text items. The computing device performs a matching operation between the first set and the second set based on a layout of the text items in the image, and determines matched name-content text items. The matched name-content text items include a name text item in the first set and a content text item matching the name text item and in the second set. The computing device outputs the matched name-content text items.

16 Claims, 11 Drawing Sheets

(51) Int. Cl.
*G06V 30/414* (2022.01)
*G06V 10/70* (2022.01)

(56) References Cited

U.S. PATENT DOCUMENTS

| | | | |
|---|---|---|---|
| 11,226,720 B1* | 1/2022 | Vandivere | G06N 7/01 |
| 11,514,188 B1* | 11/2022 | Jassal | G06F 21/6245 |
| 11,699,294 B2* | 7/2023 | Kalyuzhny | G06V 30/40 382/177 |
| 2006/0104512 A1 | 5/2006 | Hayashi et al. | |
| 2017/0344633 A1* | 11/2017 | Bose | G06F 16/358 |
| 2019/0050639 A1 | 2/2019 | Ast | |
| 2019/0087444 A1* | 3/2019 | Arakawa | H04N 1/4074 |
| 2020/0242389 A1* | 7/2020 | Ren | G06V 20/62 |
| 2020/0327319 A1* | 10/2020 | An | G06V 30/412 |
| 2020/0401799 A1* | 12/2020 | Sahoo | G06V 20/695 |
| 2021/0027087 A1* | 1/2021 | Kalyuzhny | G06V 30/153 |
| 2021/0042366 A1* | 2/2021 | Hicklin | G06F 16/9035 |
| 2021/0349941 A1* | 11/2021 | Garg | G06F 16/75 |
| 2021/0377275 A1* | 12/2021 | Grønvik | H04L 63/101 |
| 2022/0219202 A1* | 7/2022 | Blohm | G06F 40/279 |
| 2022/0366910 A1* | 11/2022 | Carbune | G10L 15/22 |

FOREIGN PATENT DOCUMENTS

| | | |
|---|---|---|
| CN | 109635277 A | 4/2019 |
| CN | 110334346 A | 10/2019 |
| CN | 111259889 A | 6/2020 |
| CN | 111709247 A | 9/2020 |
| CN | 111709339 A | 9/2020 |
| EP | 2523125 A2 | 11/2012 |
| JP | 2006261907 A | 9/2006 |
| JP | 2008204226 A | 9/2008 |
| JP | 2009176264 A | 8/2009 |
| JP | 2011150466 A | 8/2011 |
| JP | 2016115088 A | 6/2016 |

OTHER PUBLICATIONS

Extended European Search Report issued in corresponding EP Application No. 21170920.9 dated Oct. 20, 2021 (11 pages).
Hoch, Rainer "Using IR techniques for text classification in document analysis" Research and Development in Information Retrieval, Springer-Verlag New York, Inc, 175 Fifth Ave. New York, NY 10010 USA, Jul. 3, 1994, pp. 31-40 (10 pages).
Notice of Allowance issued for corresponding Chinese patent application 202011057666.2, dated Sep. 15, 2022 (11 pages).
Office Action issued for Japanese patent application 2021-152157, dated Oct. 4, 2022 (8 pages).
Office Action issued in Korean Application No. 10-2021-0128681, dated Aug. 25, 2023 (16 pages).
Mengxi Wei et al.; "Robust Layout-aware IE for Visually Rich Documents with Pre-trained Language Models;" Proceedings of the 43rd International ACM SIGIR Conference on Research and Development in Information Retrieval (SIGIR '20); Jul. 25-30, 2020; (10 pages).

* cited by examiner

METHOD AND DEVICE FOR PROCESSING INFORMATION, ELECTRONIC DEVICE, AND STORAGE MEDIUM

CROSS REFERENCE TO RELATED APPLICATIONS

This application claims priority and benefits to Chinese Application No. 202011057666.2, filed on Sep. 29, 2020, the entire content of which is incorporated herein by reference.

TECHNICAL FIELD

The disclosure generally relates to a field of computer technologies and a field of information processing technologies, particularly to a field of artificial intelligence including computer vision, deep learning, and natural language processing.

BACKGROUND

Recognizing and extracting structured information in documents or images is one of important technologies to realize information structuring of massive paper documents, which is widely used in various industries and fields such as administration, education, finance, and medical care. For example, the recognition and extraction technology of the structured information in documents or images may help administrative agencies, educational institutions, financial institutions, medical institutions to improve industry processes and intelligently upgrade business scenarios, thereby improving work efficiency.

SUMMARY

The disclosure provides a method for processing information, an electronic device, and a computer readable storage medium.

The method includes: recognizing multiple text items in an image; classifying the multiple text items into a first set of name text items and a second set of content text items based on semantics of the multiple text items; performing a matching operation on the first set and the second set based on a layout of the multiple text items in the image and determining matched name-content text items including a name text item and a content text item matching the name text item; and outputting the matched name-content text items.

The electronic device includes a processor and a memory communicatively coupled to the processor. The memory has instructions executable by the processor stored thereon. When the instructions are executed by the processor, the processor is caused to execute a method for processing information. The method includes recognizing multiple text items in an image; classifying the multiple text items into a first set of name text items and a second set of content text items based on semantics of the multiple text items; performing a matching operation on the first set and the second set based on a layout of the multiple text items in the image and determining matched name-content text items including a name text item and a content text item matching the name text item; and outputting the matched name-content text items.

The storage medium has computer instructions stored thereon. The computer instructions are configured to cause a computer to execute a method for processing information. The method includes recognizing multiple text items in an image; classifying the multiple text items into a first set of name text items and a second set of content text items based on semantics of the multiple text items; performing a matching operation on the first set and the second set based on a layout of the multiple text items in the image and determining matched name-content text items including a name text item and a content text item matching the name text item; and outputting the matched name-content text items.

It should be understood, this part is not intended to recognize key or important features of embodiments of the disclosure, nor to limit the scope of the disclosure. Other features of the disclosure will be easily understood by the following description.

BRIEF DESCRIPTION OF THE DRAWINGS

By reading the following detailed description with reference to the accompanying drawings, the above and other objects, features, and advantages of embodiments of the disclosure will become easier to understand. In the drawings, several embodiments of the disclosure are shown in an exemplary and non-limiting manner. Therefore, it should be understood, the drawings are only used to well understand the technical solutions of the disclosure, and do not constitute a limitation to the disclosure.

Throughout the drawings, the same or similar reference numerals are used to denote the same or similar components.

DETAILED DESCRIPTION

Figure 1:
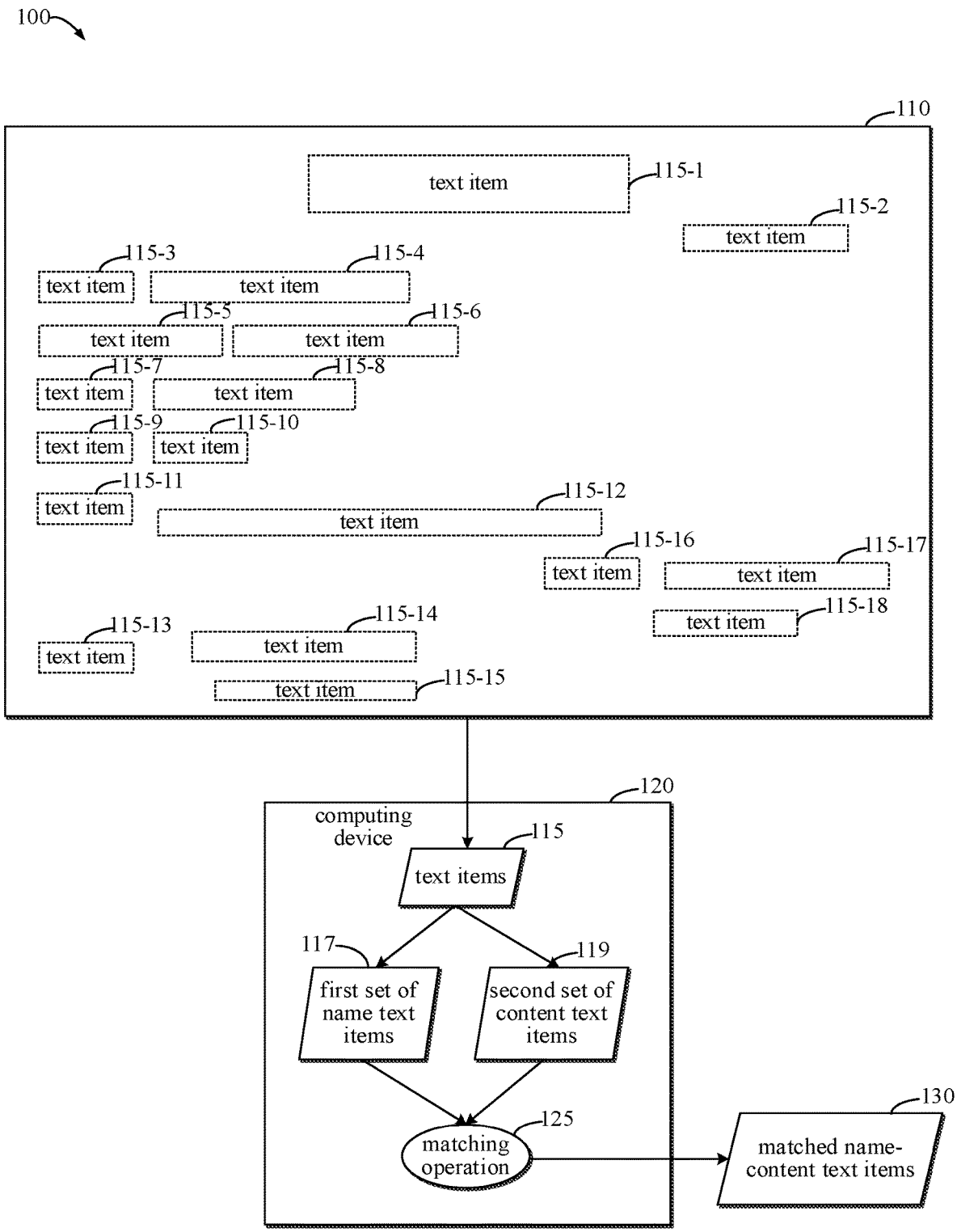
FIG. 1 is a schematic diagram illustrating an example environment in which some embodiments of the disclosure are implemented.

Hereinafter, the exemplary embodiments of the disclosure will be described with reference to the accompanying drawings, which includes various details of the embodiments of the disclosure to facilitate understanding, and it should be considered, they are merely exemplary. Therefore, those of ordinary skill in the art should realize that various changes and modifications can be made to embodiments described herein without departing from the scope and spirit of the disclosure. Likewise, for clarity and conciseness, descriptions of well-known functions and structures are omitted in the following description.

As mentioned above, recognizing and extracting the structured information (also known as structured data) in documents or images is one of the important technologies to realize the information structuring of massive paper documents. However, conventional methods of recognizing and extracting the structured information has various defects and deficiencies, resulting in poor performance in recognizing and extracting the structured information. For example, a structured information extraction method based on the templates extracts structured information in a document in a manner of template matching. For some format-fixed documents, the arrangement pattern of Key-Value pairs is relatively fixed. Therefore, such a template matching method can have a good performance on the documents of a defined template. However, this method can only process documents with a predefined layout, and cannot be directly extended to documents with other layouts, such that generalization of this method is poor. In addition, this template matching method also has a problem of high cost of labeling Key-Value pairs.

Conventional document structuring systems mostly analyze documents based on a target detection and segmentation method. For this reason, typical labeling information may include text detection box, text content, and Key-Value (KV) matching relationship. As a result, the labeling cost is high and the generalization is poor. With the development of machine learning, structuring the document information is becoming a problem of word multi-classification. That is, given some tags to be extracted, all the words in the document are classified to determine whether a word belongs to a certain tag. Thus, this word classification method based on machine learning has high labeling cost, since each word needs to be multi-classified. In addition, simple classifiers used in this method may not be able to understand the semantic information of the words, such that the generalization is poor for unused words in the training.

Most of the structured information extraction methods based on deep learning use an end-to-end network model framework. That is, both images and text embedding results are sent to a convolutional neural network or a graph network for end-to-end training. However, such an end-to-end framework based on the deep learning also has high data labeling cost. It is not only necessary to label the text position and text information, but also to label the Key-Value relationship. In addition, the deep-learning-based algorithms are all data-driven, and thus the difficulty of obtaining data will make it difficult to improve the generalization of the deep-learning-based models.

In view of the above-mentioned problems and other potential problems in existing solutions, the disclosure provides a technical solution for extracting structured information from an image in stages. In the technical solution of the disclosure, a computing device may recognize multiple text items (TIs) from the image. Further, the computing device may classify the recognized multiple text items into a first set and a second set, where the first set includes name text items (e.g., the Key of the Key-Value pair) and the second set includes content text items (e.g., the Value of the Key-Value pair). Next, the computing device may perform a matching operation between the first set and the second set to determine matched name-content text items including a name text item and a content text item matching the name text item. Thereafter, the computing device may output the matched name-content text items. Therefore, extraction of the structured information in the image is realized.

It can be seen, unlike the existing solutions, the extraction process of the structured information according to the technical solution of the disclosure can be divided into multiple stages, and thus the entire extraction process does not rely on a fixed template or need to label too much data. Therefore, the generalizability of this method may be increased and the cost of data labeling may be reduced. In addition, compared with the end-to-end model, since each stage can be optimized separately and the data used for optimizing each stage is easier obtained, the performance of the entire extraction process is easier improved.

Further, corresponding to the extraction process of the structured information in stages, the extraction system of the structured information according to the technical solution of the disclosure can be divided into multiple modules. Each module can be trained separately, thereby reducing the difficulty of obtaining training data. For example, each module can be firstly trained with general data, and then slightly adjusted based on incremental learning with a small amount of data used for the application scenarios of the disclosure. Therefore, the data for training each module is easier obtained, thereby improving the accuracy of each trained module. In conclusion, embodiments of the disclosure can improve the performance of the method or system for extracting structured information in an image.

FIG. 1 is a schematic diagram illustrating an example environment 100 in which some embodiments of the disclosure are implemented. As illustrated in FIG. 1, the example environment 100 may include an image 110 and a computing device 120. The image 110 may be any kind of images that include or record text information, such as a photo or a scanned electronic piece of a paper document or file. The image 110 may also be any kind of images, except paper documents, that are generated and used in an electronic form and has text information. More generally, the image 110 may be any kind of documents or files having information recorded in the form of text thereon. In FIG. 1, the image 110 may include text items (TIs) 115-1 to 115-18. That is, the image 110 presents or records information in the form of text items 115-1 to 115-18. As used herein, the "text item" refers to a text unit that can be considered individually in the sense of recording information. In other words, a single text item can independently express or indicate understandable information. For example, a text item may be a single word, word combination, phrase, sentence, or paragraph that is used to carry information. In the context of the disclosure, for the convenience of description, the text item may sometimes be referred to as text line, text field, field, or the like, and these terms can be used interchangeably herein.

It is to be noted that dashed boxes enclosing the text items 115-1 to 115-18 shown in FIG. 1 are only schematic and are used to indicate an approximate location and range of the text items 115-1 to 115-18 in the image 110. These dashed boxes do not actually exist in the image 110. In addition, the specific size and shape of the image 110, the specific number, specific size, specific extension direction, specific position, and specific layout of the text items 115-1 to 115-18 in the image 110 shown in FIG. 1 are merely exemplary, which are not intended to limit the scope of the disclosure. The image 110 may have any appropriate size and shape, the image 110 may have any appropriate number of text items, and the text items may have any appropriate size, any appropriate extension direction, any appropriate position, any appropriate size, and any appropriate layout. In addition, in the context of the disclosure, Chinese text is used as an example of the content of the text items 115-1 to 115-18, which is only exemplary and is not intended to limit the scope of the disclosure. Embodiments of the disclosure are equally applicable to any language characters or symbols.

In order to easily understand the text items 115-1 to 115-18 in the image 110, the image 110 described here may be a photo of a Food and Beverage Service License. In this example, the text item 115-1 can be "Food and Beverage Service License", the text item 115-2 can be "Cantonese Food Certificate No. x", the text item 115-3 can be "Company Name", the text item 115-4 can be "xx Restaurant Management Co., Ltd", the text item 115-5 can be "Legal Representative (Person in Charge)", the text item 115-6 can be "Zhang San (Legal Representative)", the text item 115-7 can be "Address", the text item 115-8 can be "No. x, x road, x city, x province", the text item 115-9 can be "Category", the text item 115-10 can be "fast food restaurant", the text item 115-11 can be "Remarks", the text item 115-12 can be "fast food manufacturing and sales (all processed with semi-finished products. Excluding: cold dishes, raw seafood, decorated cakes)", the text item 115-13 can be "Validity Period", the text item 115-14 can be "Day-Month-Year to Day-Month-Year", the text item 115-15 can be "please submit a written renewal request to the license issuing department within 10 days of the expiration of the validity period", the text item 115-16 can be "Licensing Authority", the text item 115-17 can be "x Department of State Administration for Market Regulation of x City", and the text item 115-18 can be "Day-Month-Year". It is to be noted, the specific text information of the text items 115-1 to 115-18 listed here is only illustrative, and is not intended to limit the scope of the disclosure. Embodiments of the disclosure can be applied to text items that record any text information.

As illustrated in FIG. 1, the image may be input to the computing device 120 to structurally recognize and extract the information recorded in the form of the text items 115-1 to 115-18 on the image 110. The computing device 120 may recognize the text items 115-1 to 115-18 recorded on the image 110. The computing device 120 may classify the text items 115-1 to 115-18 into a first set 117 of name text items and a second set 119 of content text items. In other words, the first set 117 is composed of name text items, and the second set 119 is composed of content text items. As used herein, the "name text item" can indicate the name or designation of the information. That is, the name text item can be regarded as the name or general name of a kind of information. For example, the name text item may correspond to the Key of the Key-Value pair. The meaning of the name text item may also be defined or set by a user or administrator of the computing device 120, and the user or administrator may configure the computing device 120 to determine the first set 117 of the name text items based on the customized meaning.

In addition, as used herein, "content text item" can indicate the content or entity of information. That is, the content text item can be considered as the content or substance of a kind of information. For example, the content text item may correspond to Value of the Key-Value pair. The meaning of the content text item can also be defined or set by a user or administrator of the computing device 120, and the user or administrator can configure the computing device 120 to determine the second set 119 of content text items based on the customized meaning. More generally, the "name text item" in the disclosure may refer to a text item that can be paired with a "content text item" in the sense of expressing information, and is not limited to indicating the name of the information. Similarly, the "content text item" may refer to a text item that can be paired with a "name text item" in the sense of expressing information, and is not limited to indicating the content of the information.

For example, for the above-mentioned image 110 of the Food and Beverage Service License, the computing device 120 may determine that the text items 115-1, 115-3, 115-5, 115-7, 115-9, 115-11, 115-13, and 115-16 are name text items, and thus the first set 117 may include these name text items. In addition, the computing device 120 may determine that the text items 115-2, 115-4, 115-6, 115-8, 115-10, 115-12, 115-14, 115-15, 115-17, and 115-18 are content text items, and thus the second set 119 can include these content text items.

After classifying the text items 115-1 to 115-18 into the first set 117 and the second set 119, the computing device 120 may perform a matching operation 125 between the first set 117 and the second set 119, to determine matched name-content text items. The matched name-content text items include a name text item and a content text item matching the name text item. The computing device 120 may output the name text item and the content text item matching the name text item, thereby realizing the recognition and extraction of the structured information in the image 110. For example, the computing device 120 may determine and output all pairs of matched name-content text items from the first set 117 and the second set 119. Certainly, the computing device 120 may also recognize and output a subset (e.g., only one or a predetermined number) of all pairs of matched name-content text items from the image 110 based on user or administrator settings or in a specific application scenario.

Therefore, the computing device 120 in the disclosure can be regarded as an intelligent structured information recognition and extraction system that can be applicable to generalized layouts of images. For any input image (such as the image 110), after staged image processing or information processing, the computing device 120 can output all paired name-content text items (each paired name-content text items includes a name text item and a content text item matching the name text item) of the image 110 or a subset thereof. Certainly, when no structured information is recorded on the image 110, the computing device 120 may determine that there are no matched name-content text items in the image 110, and output an indication that there are no matched name-content text items or do not output anything. Since the computing device 120 intelligently processes the image 110 and outputs a processing result related to natural language, it can also be considered that the computing device 120 implements artificial intelligence technologies such as computer vision and natural language processing.

In some examples, the computing device 120 may be any device capable of implementing computing functions and/or control functions. The computing device 120 may be any type of fixed computing devices, mobile computing devices, or portable computing devices, including but not limited to, special-purpose computer, general-purpose computer, desktop computer, laptop computer, notebook computer, netbook computer, tablet computer, multimedia computer, mobile phone, general-purpose processor, microprocessor, microcontroller, or state machine. The computing device 120 can be implemented as an individual computing device or a combination of computing devices, for example, a combination of a digital signal processor (DSP) and a microprocessor, multiple microprocessors, one or more microprocessors combined with a DSP core, or any other such configurations.

In addition, it is to be understood that FIG. 1 only schematically shows objects, units, elements, or components related to the disclosure. In practice, the example environment 100 may also include other objects, units, elements, or components. In addition, the specific number of objects, units, elements, or components illustrated in FIG. 1 is only illustrative, and is not intended to limit the scope of the disclosure. The example environment 100 may include any suitable number of objects, units, elements, or components. Therefore, the disclosure is not limited to the specific scenario depicted in FIG. 1, but is generally applicable to any technical environment of recognizing and extracting the structured information. Hereinafter, as illustrated in FIG. 2, an example process for recognizing and extracting structured information according to some embodiments of the disclosure is described.

Figure 2:
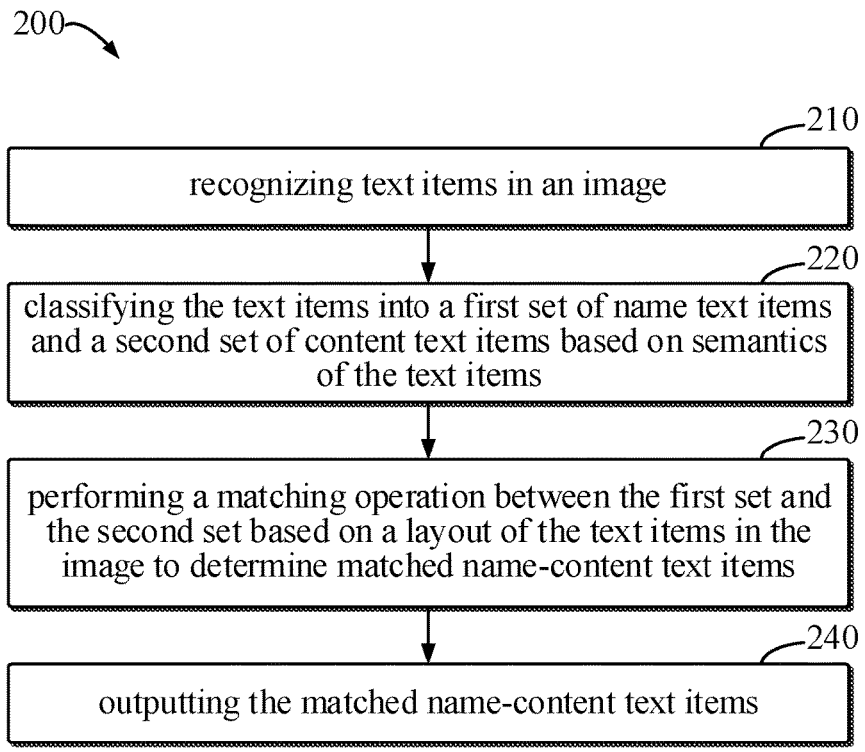
FIG. 2 is a flowchart illustrating an example process of a method for processing information according to some embodiments of the disclosure.

FIG. 2 is a flowchart illustrating an example process 200 of a method for processing information according to some embodiments of the disclosure. The example process 200 may be implemented by the computing device 120 in the example environment 100. For example, the example process 200 may be executed by a processor or processing unit of the computing device 120, or executed by various functional modules of the computing device 120. The example process 200 may also be executed by a computing device independent of the example environment 100, or by other units or modules in the example environment 100. For ease of explanation, an example process 200 will be described with reference to FIG. 1.

At block 210, the computing device 120 may recognize multiple text items 115-1 to 115-18 in the image 110. In other words, the computing device 120 can not only detect the presence of the text items 115-1 to 115-18 in the image 110, but also recognize which words or symbols each of the text items 115-1 to 115-18 includes. It is to be noted that the computing device 120 may recognize the text items 115-1 to 115-18 in the image 110 in various methods. For example, the computing device 120 may recognize the text items 115-1 to 115-18 in the image 110 with the optical character recognition (OCR) technology. The computing device 120 may also recognize the text items 115-1 to 115-18 in the image 110 with a trained end-to-end text recognition model based on convolutional neural network. The computing device 120 may detect text item regions (TI regions) corresponding to the text items 115-1 to 115-18 in the image 110, and recognize the text items 115-1 to 115-18 from these text item regions, which will be described with reference to FIGS. 3 to 6.

At block 220, the computing device 120 may classify the text items 115-1 to 115-18 into the first set 117 of name text items and the second set 119 of content text items based on the semantics of the text items 115-1 to 115-18. It is to be understood that the computing device 120 may obtain the first set 117 and the second set 119 through the classification based on the semantics of the text items 115-1 to 115-18 in any suitable methods. As an example, the computing device 120 may determine the semantics of a text item by recognizing a keyword contained in the text item, and then determine whether the text item is a name text item or a content text item based on the semantics of the text item. For example, from the image 110 of the Food and Beverage Service License, the computing device 120 can recognize that the text item 115-3 (i.e., "Company Name") includes the keywords such as "Company" and/or "Name", and thus determine the semantics of this text item is an entity type (i.e., "Company") or an entity name, belonging to the name of the information. Therefore, the computing device 120 determines that the text item 115-3 is a name text item. The computing device 120 can also recognize that the text item 115-4 (i.e., "xx Restaurant Management Co., Ltd") includes the keyword such as "Co.,", and thus determine that the semantics of the text item is a specific name of a company, belonging to the content of the information. Therefore, the computing device 120 can recognize that the text item 115-4 is a content text item.

The computing device 120 may store or access a list of name text items and a list of content text items, where these two lists may be predetermined and recorded based on the semantics of the text items. In this case, for each of the text items 115-1 to 115-18, the computing device 120 can find the text item by querying the two lists and determine whether the text item is a name text item or a content text item. For example, in the image 110 of the Food and Beverage Service License, if the computing device 120 finds the text item 115-1 in the list of name text items, the computing device 120 may determine that the text item 115-1 is a name text item. If the computing device 120 finds the text item 115-2 in the list of content text items, the computing device 120 may determine that the text item 115-2 is a content text item. If a text item cannot be found in either the list of name text items or the list of content text items, the computing device 120 may determine whether the text item is a name text item or a content text item based on the semantics of the text item, and add the text item to a corresponding list.

The computing device 120 may determine the first set 117 of name text items and the second set 119 of content text items with a trained semantic classification model based on machine learning. For example, a trained semantic classification model can be implemented at the computing device 120, and the text items 115-1 to 115-18 can be input into the semantic classification model respectively. The semantic classification model can determine whether each text item is a name text item or a content text item, and output a corresponding classification result. The above process will be described with reference to FIGS. 7 to 10.

At block 230, based on a layout of the text items 115-1 to 115-18 in the image 110, the computing device 120 may perform a matching operation between the first set 117 and the second set 119 to determine matched name-content text items, where the matched name-content text items include a name text item in the first set 117 and a content text item in the second set 119 and matching the name text item. As used herein, the "matched" text items refer to that the name text item and the content text item can be provided in association, and together provide more complete information. For example, in a case where the name text item is the Key in the Key-Value pair, the content text item that matches the name text item can be the Value in the Key-Value pair. More generally, as used herein, the matched name-content text items may refer to a name text item and a content text item that are associated or correspond to each other in any form such that they can be provided or presented together.

Therefore, in the image 110 of Food and Beverage Service License, it may be considered that the name text item 115-3 and the content text item 115-4 match to each other, the name text item 115-5 and the content text item 115-6 match to each other, the name text item 115-7 and the content text item 115-8 match to each other, the name text item 115-9 and the content text item 115-10 match to each other, the name text item 115-11 and the content text item 115-12 match to each other, the name text item 115-13 and the content text item 115-14 match to each other, and the name text item 115-16 and the content text item 115-17 match to each other. However, it is to be pointed out that in the disclosure, the matching relationship between the name text item and the content text item determined by the computing device 120 is based on the semantic relationship therebetween. The computing device 120 determines the matching relationship between the name text item and the content item text based on the layout of the name text items and the content text items in the image 110, i.e., the position of each text item, the overall arrangement of the text items, and the positional relationship between the text items.

In detail, the computing device 120 may perform the matching operation between the name text items and the content text items in various ways based on the layout of text items in the image. For example, in the image 110, a content text item matching a name text item is generally a content text item nearest the name text item. Therefore, for each name text item contained in the first set 117, the computing device 120 may determine a content text item nearest the name text item as the content text item matching the name text item. Certainly, in a similar manner, for each content text item contained in the second set 119, the computing device 120 may also determine a name text item nearest the content text item as a name text item matching the content text item.

For example, in the image 110, a content text item matching a name text item is usually a content text item in the same horizontal direction as the name text item. Therefore, for each name text item contained in the first set 117, the computing device 120 may determine that the content text item in the same horizontal direction as the name text item is the content text item matching the name text item. Certainly, in a similar manner, for each content text item contained in the second set 119, the computing device 120 may determine that the name text item in the same horizontal direction as the content text item is the name text item matching the content text item. It is to be noted that information arrangement of the image 110 may not in a left-right pattern, that is, the name text item and content text item contained in the matched name-content text items are not arranged in a left-right direction in the image 110. For example, the name text item and the content text item contained in the matched name-content text items may be arranged in an up-down direction. In this case, the positional relationship between the name text item and the content text item contained in the matched name-content text items can be determined based on the information arrangement of the image 110, and not necessarily in the same horizontal direction.

In order to improve the accuracy in determining the matched name-content text items by the computing device 120, the computing device 120 may set a matching condition of determining the matched name-content text items in advance. The matching condition may be determined based on experiences, the information arrangement of the image 110, and/or the positional relationship between a name text item and a content text item matching the name text item, to reduce a probability of determining a name text item and a content text item mismatching the name text item as the matched name-content text items by the computing device 120. Therefore, when a name text item and a content text item do not meet the predetermined matching condition, the computing device 120 can determine that these two text items do not match each other, thereby avoiding falsely determining the matched name-content text items. The above process will be described with reference to FIGS. 11 to 15.

At block 240, the computing device 120 may output the matched name-content text items, i.e., the name text item and the content text item matching the name text item. For example, the computing device 120 may output the matched name-content text items in pairs, indicating that there is a matching relationship between the name text item and the content text item. The computing device 120 may also output the matched name-content text items in the form of text. For example, in the image 110 of Food and Beverage Service License, the computing device 120 may output the matched name-content text items in pairs as follows: name text item 115-3: content text item 115-4 (i.e., Company Name: xx Restaurant Management Co., Ltd), name text item 115-5: content text item 115-6 (i.e., Legal Representative (Person In Charge): Zhang San (legal representative)), . . . , name text item 115-16: content text item 115-17 (i.e., Issuing Authority: x Department of State Administration for Market Regulation of x City). The output format of the matched name-content text items may be {name text item 115-3, content text item 115-4} (i.e., {Company Name, xx Restaurant Management Co., Ltd}, {name Text item 115-5, content text item 115-6} (i.e., {Legal Representative (Person In Charge), Zhang San (legal representative)}, . . . , {name text item 115-16, content text item 115-17} (i.e., {Issuing Authority, xx Department of State Administration for Market Regulation of x City}). The computing device 120 may also output matched name-content text items in the form of a graphical representation. The above process will be described later with reference to FIG. 16.

It is to be seen that the example process 200 according to the disclosure proposes a stage-by-stage information structing method of a general image (or document). The entire extraction process of the structured information does not rely on a fixed template or need to label too much data, thereby improving generalizability of the method and reducing the cost of data labeling. In addition, because each stage can be optimized separately and the data used for optimizing each stage is easier obtained compared with the end-to-end model, the performance of the entire extraction process of structured information is easier improved.

With the computing device 120 for executing the example process 200, multiple modules may separately execute multiple stages of the example process 200, and each module can be trained separately. In detail, as will be described in detail later, the module for each stage can be trained using general data, and then slightly adjusted using a small amount of scene data based on the incremental learning. In this way, the data used to train the module for each stage may be easily obtained, and more training data can significantly improve the accuracy of each module and achieve good generalization capabilities, thereby avoiding Cold Start problems of high cost of obtaining training data for the end-to-end model, difficulty in achieving training convergence, and poor generalization capability.

As mentioned above in the block 210 of FIG. 2, the computing device 120 may detect the text item regions corresponding to the text items 115-1 to 115-18 in the image 110, and recognize the text items 115-1 to 115-18 respectively from the text item regions. For example, the computing device 120 may detect the text item regions where the text items 115-1 to 115-18 are located in the image using a text item detection model based on machine learning (for example, deep learning). The computing device 120 may recognize the text items 115-1 to 115-18 from the text item regions using a text recognition model based on machine learning (for example, deep learning). In this way, the recognition of the text items 115-1 to 115-18 in the image 110 can be split into two different stages. Since the stages respectively focus on different functions, the machine learning models with specialized functions can be used, thereby improving the detection accuracy of the text items 115-1 to 115-18. The above process will be described below with reference to FIGS. 3 to 6.

Figure 3:
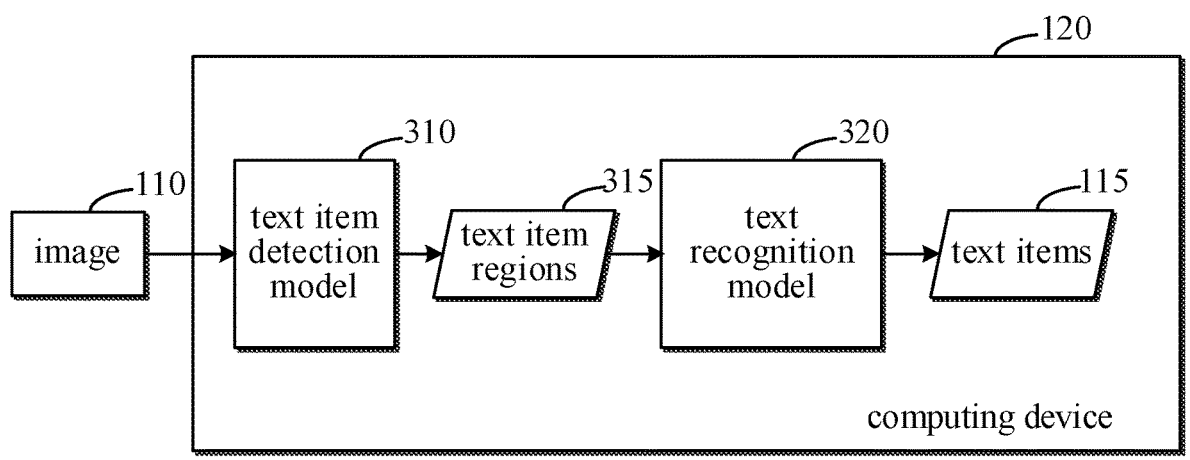
FIG. 3 is a schematic diagram of recognizing text items (TIs) in an image based on a text item detection model and a text recognition model according to some embodiments of the disclosure.

FIG. 3 is a schematic diagram of recognizing text items 115-1 to 115-18 in the image 110 based on a text item detection model 310 and a text recognition model 320 according to some embodiments of the disclosure. As illustrated in FIG. 3, in order to recognize the text items 115-1 to 115-18 in the image 110, a text item detection model 310 and a text recognition model 320 may be implemented in the computing device 120. The text item detection model 310 may be used to detect multiple text item regions 315 (i.e., image regions contained in the image 110 and corresponding to the text items 115-1 to 115-8). Since the unit of a detected target is text item (also called a field or a text line), the text item detection model 310 can also be called a field-level text line detector, which can perform field-level text line detection. The text recognition model 320 can recognize the text contained in the multiple text item regions 315, that is, what is included in each of the text items 115-1 to 115-18.

Therefore, in the example of FIG. 3, after the image 110 is input to the computing device 120, the computing device 120 may detect multiple text item regions 315 from the image 110 based on the text item detection model 310 and recognize the text items 115-1 to 115-18 from the multiple text item regions 315 based on the text recognition model 320. In detail, the computing device 120 may send the multiple text item regions 315 where the text items 115-1 to 115-18 are located to the text recognition model 320 for text recognition, to obtain all text item information in the image 110. In order to improve the accuracy of the text recognition, the computing device 120 may appropriately enlarge each text item region 315 obtained by the text item detection model 310. For example, the computing device 120 may appropriately expand the width or the height of each text item region 315 by 0.15 times. The computing device 120 may send all the expanded image regions into the text recognition model 320 to perform the text recognition.

Both the text item detection model 310 and the text recognition model 320 may be neural network models based on the machine learning (for example, deep learning). For example, the text item detection model 310 may be an EAST (efficient and accurate scene text) text detection network based on a residual network Resnet-50. The text recognition model 320 may be a CTC (connectionist temporal classification) text recognition model based on a residual network Resnet-101. In addition, both the text item detection model 310 and the text recognition model 320 may also be other suitable deep learning models. Further, both the text item detection model 310 and the text recognition model 320 may also be implemented as non-machine learning models.

Figure 4:
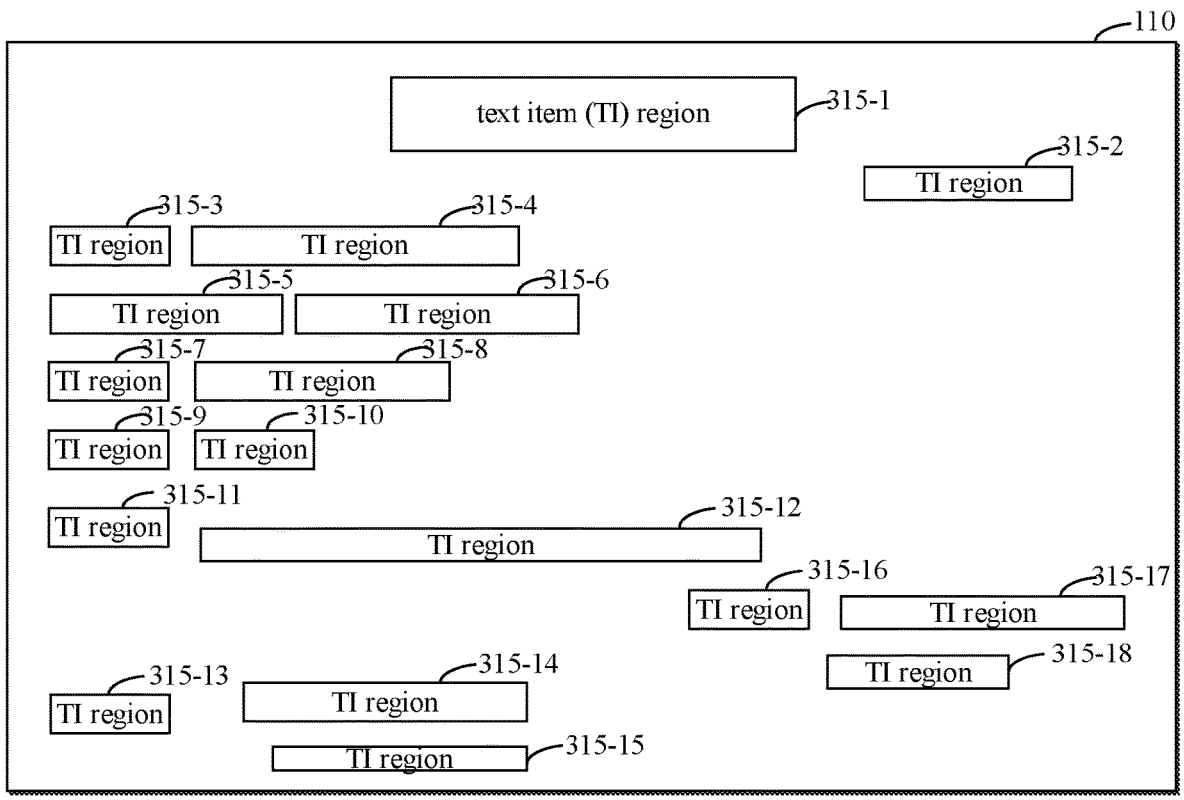
FIG. 4 is a schematic diagram illustrating text item regions detected by a text item detection model according to some embodiments of the disclosure.

FIG. 4 is a schematic diagram illustrating text item regions 315-1 to 315-18 detected by the text item detection model 310 according to some embodiments of the disclosure. As illustrated in FIG. 4, for the image 110 depicted in FIG. 1, the text item detection model 310 can detect that there are text items 115-1 to 115-18 in the image 110, and use rectangular boxes to mark the text item regions 315-1 to 315-18 where the text items 115-1 to 115-18 are located. For example, the text item detection model 310 can mark a text item region 315-1 including the text item 115-1, a text item region 315-2 including the text item 115-2, . . . , and a text item region 315-18 including the text item 115-18. It is to be noted that the rectangular boxes for marking the text item regions 315-1 to 315-18 in FIG. 4 are only exemplary, and are not intended to limit the scope of the disclosure. The text item regions 315-1 to 315-18 may have any suitable shape, or one or more of the text item regions 315-1 to 315-18 may have different shape from other text item regions.

In addition to marking the text item regions 315-1 to 315-18, the text item detection model 310 may also provide a positional coordinate of each text item region 315-1 to 315-18 in the image 110. For example, the computing device 120 may use the positional coordinates of the text item regions 315-1 to 315-18 to perform the subsequent matching operation between the name text items and the content text items. In a case where the text item regions 315-1 to 315-18 are rectangular boxes, the text item detection model 310 may provide coordinates of four corner points, or provide a coordinate of one corner point, the width, and the height of the rectangular box, for each text item region 315-1 to 315-18. Certainly, in the case where the text item regions 315-1 to 315-18 have other shapes, the text item detection model 310 can provide the positional coordinates of the text item regions 315-1 to 315-18 in other ways suitable for these shapes.

The text item detection model 310 may be a model specially designed and trained for technical scenarios of structured information extraction. However, the training data for this special model may be difficultly obtained because the cost of obtaining scene data for the structured information extraction is high, that is, there is difficulty in acquiring the structured data. Therefore, in order to avoid the problem of high cost of obtaining the scene data and considering that retraining a new model is more costly than adjusting an existing model, the disclosure may optimize an existing general model using incremental learning to obtain the text item detection model 310. For example, in a process of implementing the text item detection model 310, the computing device 120 may obtain a general model that is trained using general data, and train the general model using a small amount of scene data based on that incremental learning, such that the trained general model after the incremental learning (i.e., the text item detection model 310) has better performance and lower cost than retraining a new model. The above will be described below with reference to FIGS. 5 and 6.

Figure 5:
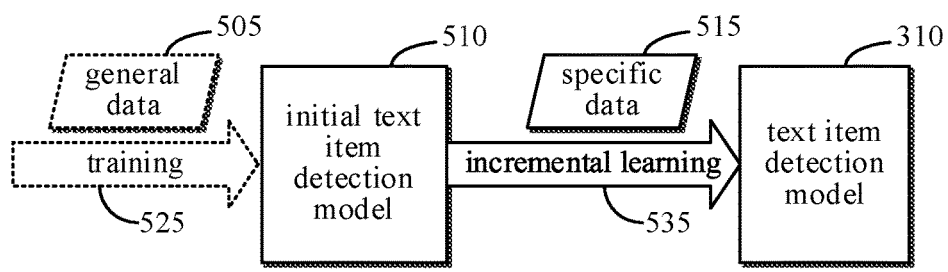
FIG. 5 is a schematic diagram of constructing a text item detection model by performing incremental learning of an initial text item detection model according to some embodiments of the disclosure.

FIG. 5 is a schematic diagram of constructing a text item detection model 310 by performing incremental learning 535 of an initial text item detection model 510 according to some embodiments of the disclosure. As illustrated in FIG. 5, the text item detection model 310 may be constructed by performing the incremental learning 535 of the initial text item detection model 510 based on special data 515. For example, the computing device 120 may obtain the initial text item detection model 510 from a model provider, and perform the incremental learning 535 of the initial text item detection model 510 based on the special data 515 to generate the text item detection model 310. As used herein, the "special data" may refer to data related to technical scenarios of structured information recognition and extraction. More generally, the "special data" may refer to data related to the technical scenarios involved in the disclosure. The special data 515 may include annotated name text items and annotated content text items, such that the initial text item detection model 510 can incrementally learn characteristics of the name text items and content text items in the disclosure. In the context of the disclosure, the annotations of the name and content text items may also be referred to as field-level annotation or labeling.

It is to be noted that although in the foregoing description, the computing device 120 performs the incremental learning 535 of the initial text item detection model 510, this is only exemplary and is not intended to limit the scope of the disclosure. One or more computing devices other than the computing device 120 may perform the incremental learning 535 of the initial text item detection model 510 to generate the text item detection model 310, and the computing device 120 may directly obtain the text item detection model 310 constructed through the incremental learning 535 from the one or more computing devices, to detect the text item regions in the image 110.

In addition, as illustrated in FIG. 5, the initial text item detection model 510 may be trained 525 using general data 505. Therefore, the initial text item detection model 510 may also be referred to as a general text item detection model 510. As used herein, the "general data" may refer to data that is not specifically related to the technical scenarios of structured information recognition and extraction. More generally, the "general data" may generally refer to data that is not specifically related to the technical scenarios involved in the disclosure. It is to be noted, the training 525 of the initial text item detection model 510 is usually not performed by the computing device 120, and the training 525 and the incremental learning 535 of the initial text item detection model 510 may be executed by different computing devices. Certainly, both the training 525 and the incremental learning 535 of the initial text item detection model 510 may be performed by the computing device 120.

It is to be noted that in the example of FIG. 5, the initial text item detection model 510 may be trained using general data 505, but may not be trained using the special data 515. Since the general data (for example, field row detection training data) is generally segmented and annotated based on semantic information and spatial location, the Key and the Value cannot be separated well, and training a specialized model by relabeling massive Key-Value field data causes the cost high. In the disclosure, the initial text item detection model 510 is trained with the general data 505, and the text item detection model 310 is generated by performing the incremental learning with the special data 515. For example, a small amount of Key-Value field-level data is used for the slight adjustment, such that the text item detection model 310 can quickly obtain knowledge of Key-Value field detection. In terms of the detection effect of text items, the initial text item detection model 510 may not be able to accurately detect each text item in the image 110, while the text item detection model 310 can accurately detect each text item in the image 110. The above will be described below with reference to FIG. 6.

Figure 6:
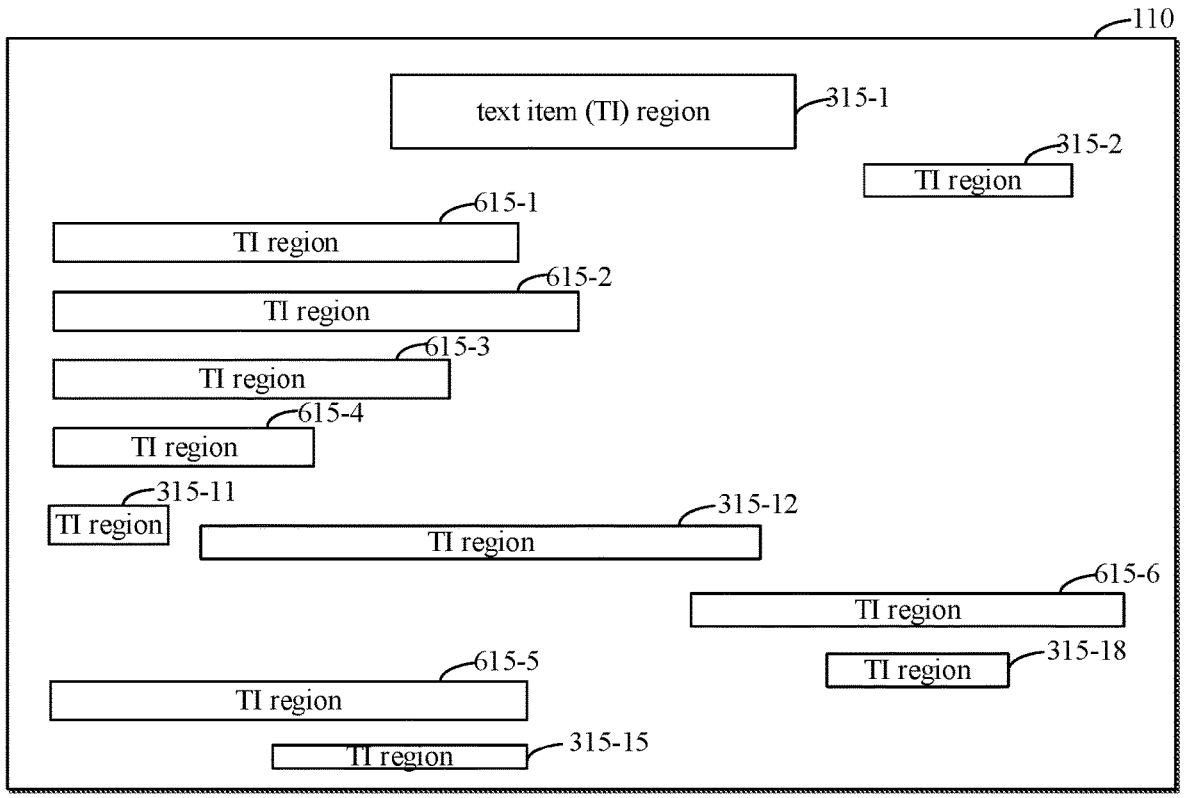
FIG. 6 is a schematic diagram illustrating text regions detected by the initial text item detection model according to some embodiments of the disclosure.

FIG. 6 is a schematic diagram illustrating text item regions detected by the initial text item detection model 510 according to some embodiments of the disclosure. As illustrated in FIG. 6, for the image 110 depicted in FIG. 1, compared to the text item regions 315-1 to 315-18 detected by the text item detection model 310 depicted in FIG. 4, the general text item detection model 510 can detect the text item regions 315-1, 315-2, 315-11, 315-12, 315-15, and 315-18, since there are no other text items close to the text items corresponding to these text item regions. However, compared with the text item regions 315-1 to 315-18 detected by the text item detection model 310, the general text item detection model 510 cannot detect the text item regions 315-3 to 315-10, 315-13, 315-14, 315-16, and 315-17, since there are other text items close to the text items corresponding to these text item regions. In detail, since the text item regions corresponding to the text items 115-3 and 115-4 are relatively close to each other, and the general text item detection model 510 is not trained based on the incremental learning using the special data 515, the general text item detection model 510 will detect the text items 115-3 and 115-4 as a whole text item region, i.e., the text item region 615-1. Similarly, as illustrated, the general text item detection model 510 detects the text items 115-5 and 115-6 as a whole text item region 615-2, the text items 115-7 and 115-8 as a whole text item region 615-3, the text items 115-9 and 115-10 as a whole text item region 615-4, the text items 115-13 and 115-14 as a whole text item region 615-5, and the text item 115-16 and 115-17 as a whole text item region 615-6.

As mentioned above in the block 220 of FIG. 2, the computing device 120 may determine the first set 117 of name text items and the second set 119 of content text items using a trained semantic classification model based on machine learning. For example, the trained semantic classification model can be implemented at the computing device 120, and the text items 115-1 to 115-18 can be input into the trained semantic classification model, such that the trained semantic classification model can determine whether each text item is a name text item or a content text item, and output a corresponding classification result. With the semantic classification model based on machine learning (for example, deep learning), the efficiency and accuracy in classifying the text items by the computing device 120 can be improved. The above will be described below with reference to FIGS. 7 to 10.

Figure 7:
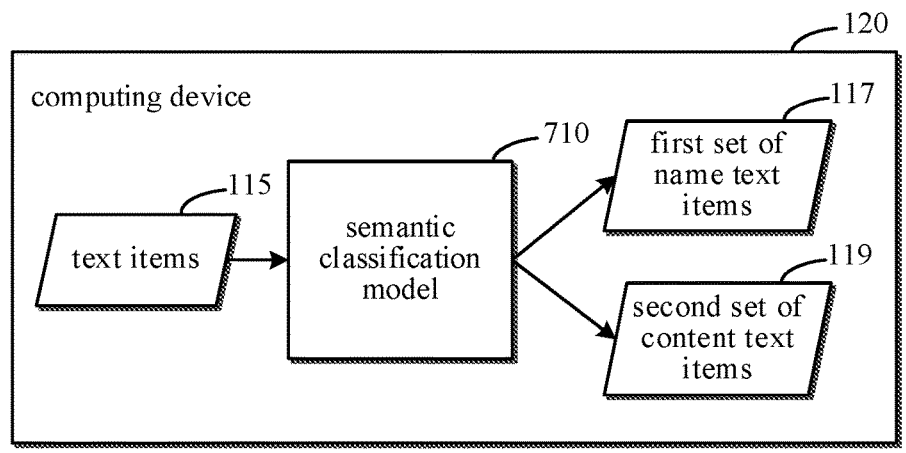
FIG. 7 is schematic diagram of classifying text items into a first set of name text items and a second set of content text items based on a semantic classification model according to some embodiments of the disclosure.

FIG. 7 is a schematic diagram of classifying the text items 115-1 to 115-18 into the first set 117 of name text items and the second set 118 of content text items based on the semantic classification model 710 according to some embodiments of the disclosure. As illustrated in FIG. 7, in order to classify the text items 115-1 to 115-18, the semantic classification model 710 can be implemented in the computing device 120. The semantic classification mode 710 can determine whether each text item is a name text item or a content text item. Therefore, after recognizing the text items 115-1 to 115-18 in the image 110, the computing device 120 may determine whether each of the text items 115-1 to 115-18 is a name text item or a content text item based on the semantic classification model 710, to determine the first set 117 of name text items and the second set 119 of content text items. The semantic classification model 710 may be an ERNIE (Enhanced Representation through kNowledge IntEgration) model. The semantic classification model 710 may also be another suitable deep learning model. The semantic classification model 710 may also be implemented using a non-machine learning model.

The semantic classification model 710 may be a model specially designed and trained for the technical scenarios of structured information extraction. However, the training data for this special model may be difficultly obtained since the cost of obtaining the scene data of the structured information extraction is high. That is, there is a difficulty in obtaining the structured data. Therefore, in order to avoid the problem of high cost of acquiring the scene data and considering that retraining a new model is more costly than adjusting an existing model, the disclosure may optimize an existing general model using the incremental learning to obtain the semantic classification model 710. For example, in a process of implementing the semantic classification model 710, the computing device 120 may obtain a general model that is trained using general data, and train the general model using a small amount of scene data based on incremental learning, such that the trained general model after the incremental learning (i.e., the semantic classification model 710) has better performance and lower cost than retraining a new model. The above will be described below with reference to FIG. 8.

Figure 8:
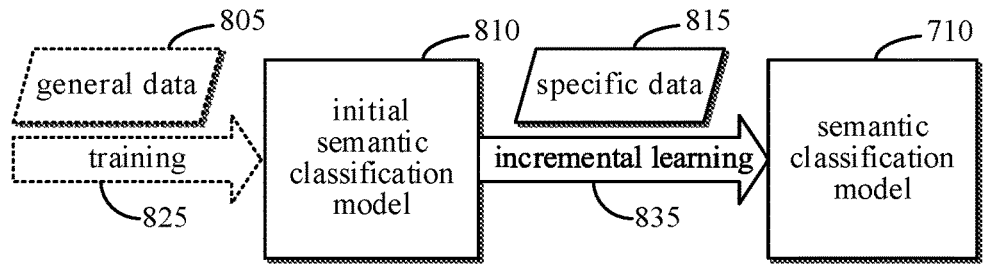
FIG. 8 is a schematic diagram of constructing a semantic classification model by performing incremental learning of an initial semantic classification model according to some embodiments of the present disclosure.

FIG. 8 is a schematic diagram of constructing a semantic classification model 710 by performing incremental learning 835 of an initial semantic classification model 810 according to some embodiments of the disclosure. As illustrated in FIG. 8, the semantic classification model 710 may be constructed by performing the incremental learning 835 of the initial semantic classification model 810 based on special data 815. For example, the computing device 120 may obtain the initial semantic classification model 810 from a model provider, and perform the incremental learning 835 of the initial semantic classification model 810 with the special data 815 to generate the semantic classification model 710. As used herein, the "special data" may refer to data related to technical scenarios of structured information recognition and extraction. More generally, the "special data" may refer to data related to the technical scenarios involved in the disclosure. The special data 815 may include annotated name text items and annotated content text items, such that the initial semantic classification model 810 can incrementally learn characteristics of the name text items and the content text items in the disclosure. In the context of the disclosure, the annotations of the name and content text item may also be referred to as field-level annotation or labeling.

It is to be noted that although in the foregoing description, the computing device 120 performs the incremental learning 835 of the initial semantic classification model 810, this is only exemplary and is not intended to limit the scope of the disclosure. One or more computing devices other than the computing device 120 may perform the incremental learning 835 of the initial semantic classification model 810 to generate the semantic classification model 710, and the computing device 120 can directly obtain the semantic classification model 710 constructed through the incremental learning 835 from the one or more computing devices, to classify the text items 115-1 to 115-18 into the first set 117 and the second set 119. As mentioned above, the semantic classification model 710 may be a semantic entity recognition model based on ERNIE. Since the ERNIE provides pre-trained models at three levels of lexical, grammatical, and semantics, the computing device 120 can obtain a Key-Value entity classification model with superior performance based on incremental learning with a small amount of data. For example, in order to obtain better generalization, the computing device 120 may directly collect the Key-Value corpus in the general corpus for performing the incremental learning of the ERNIE model, thereby greatly reducing the cost of obtaining the training data.

In addition, as illustrated in FIG. 8, the initial semantic classification model 810 may be trained 825 using general data 805. Therefore, the initial semantic classification model 810 may also be referred to as a general semantic classification model 810. As used herein, the "general data" may refer to data that is not specifically related to the technical scenarios of structured information recognition and extraction. More generally, the "general data" may generally refer to data that does not specifically related to the technical scenarios involved in the disclosure. It is to be noted, the training 825 of the initial semantic classification model 810 is usually not performed by the computing device 120, and the training 825 and the incremental learning 835 of the initial semantic classification model 810 may be executed by different computing devices. Certainly, both the training 825 and the incremental learning 835 of the initial semantic classification model 810 may be performed by the computing device 120.

Figure 9:
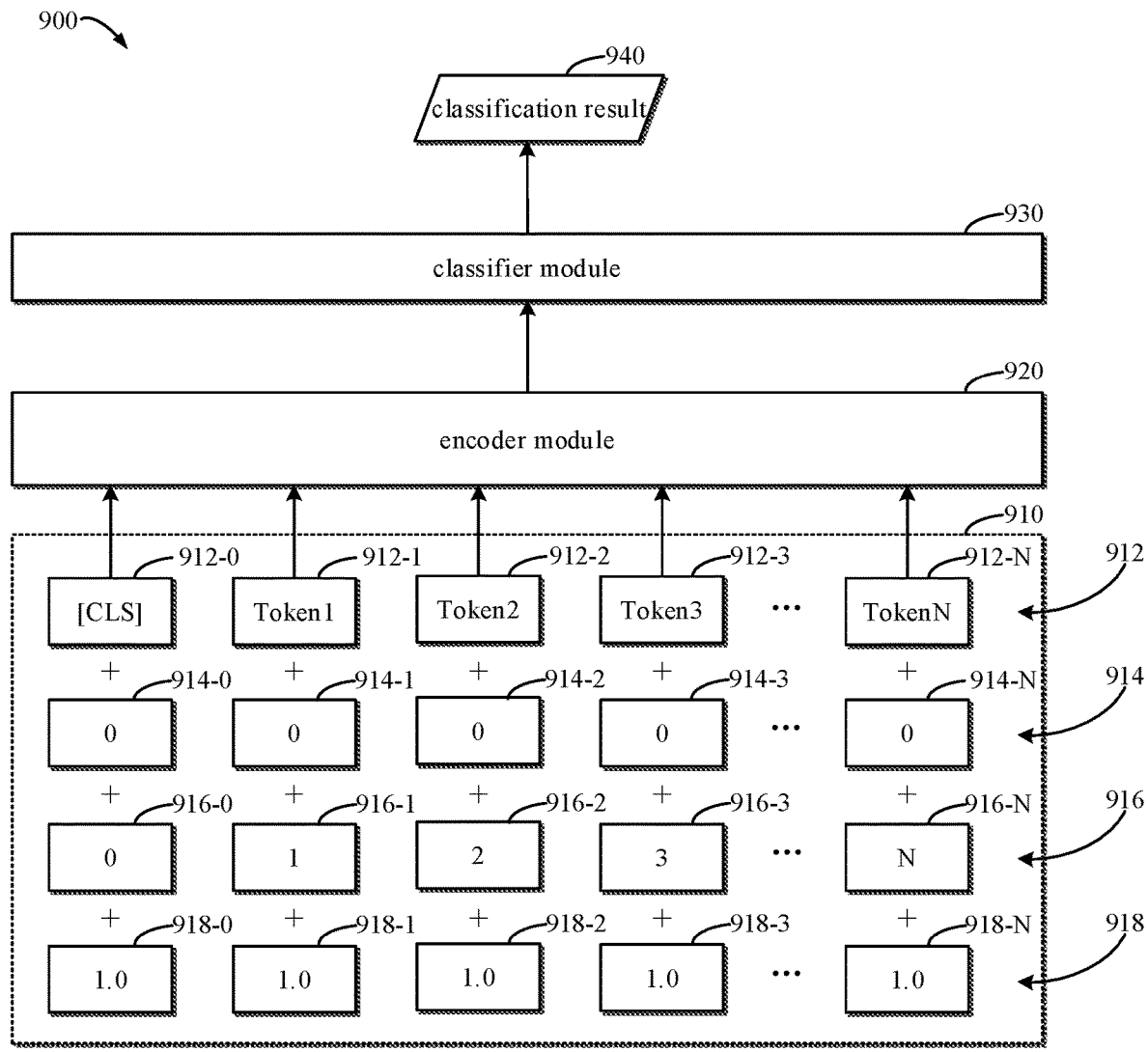
FIG. 9 is a schematic diagram illustrating a semantic classification model according to some embodiments of the present disclosure.

FIG. 9 is a schematic diagram illustrating an example structure 900 of a semantic classification model 710 according to some embodiments of the disclosure. The example structure 900 may be based on the ERNIE model. The semantic understanding model based on ERNIE may be used in technical scenarios of structuring document information. Therefore, the ERNIE model can perform semantics understanding on general name text items and general content text items (for example, Keys and Values) in the training set, and thus it have better generalization capability for the name text items and the content text items (for example, Keys and Values) of various layouts, and can directly support a variety of typical low-frequency vertical classes. The example structure 900 of the semantic classification model 710 may also be constructed as other appropriate machine learning models.

As illustrated in FIG. 9, the example structure 900 includes an input embedding module 910, an encoder module 920, and a classifier module 930. In the example of FIG. 9, the input embedding module 910 may use four embedding vectors to represent an input text item. The four embedding vectors include a Token embedding vector 912, a sentence embedding vector 914, a position embedding vector 916, and a mask embedding vector 918.

To obtain the Token embedding vector 912, the computing device 120 may segment the input text item by characters, words, or other language units, such that one or more Tokens are obtained. In other words, the Token refers to the character, the word or other language unit after the text item is segmented. The computing device 120 may determine a serial number for each Token based on a predetermined mapping relationship (for example, a predetermined dictionary). Then, the computing device 120 may input the serial number of the Token into the embedding layer to obtain the Token embedding vector (e.g., a 128- or 512-dimensional vector) of the Token. In the example in FIG. 9, a text item is segmented into Token1, Token2, Token3, . . . , TokenN. The Token embedding vectors 912-1 to 912-N respectively represent the embedding vectors of these Tokens. In addition, the first Token embedding vector 912-0 indicates that the example structure 900 is the classification task, and is marked as [CLS].

The sentence embedding vector 914 indicates a sentence number of a sentence where each Token is located. Here, since all Tokens belong to the same text item, and thus it can be considered that all Tokens are in the same sentence. Therefore, in the example of FIG. 9, the sentence embedding vectors 914-1 to 914-N of Token1, Token2, Token3, . . . , TokenN are all the same vector representing the sentence number 0. In addition, the sentence embedding vector 914-0 is also set to represent the sentence number 0. The position embedding vector 916 is to enable the example structure 900 to obtain the sequence of the Tokens in the sentence. Therefore, the position embedding vector 916 indicating the position information of each token in the text item is added to the input embedding vector. In the example of FIG. 9, the position embedding vectors 916-1 to 916-N of Token1, Token2, Token3, . . . , TokenN are vectors representing the position 1 to the position N respectively. In addition, the position embedding vector 916-0 is set to represent the position 0. The mask embedding vector 918 indicates whether each Token is masked. Here, since none of Tokens is masked, in the example of FIG. 9, the mask embedding vectors 918 to 919-N of Token1, Token2, Token3, . . . , TokenN are all the same vector of an indication value 1.0 representing no masking. In addition, the mask embedding vector 918-0 is also set as a vector of the indicating value 1.0. In the example of FIG. 9, the input embedding module 910 may sum the four embedding vectors of each Token of the input text item to obtain an input vector. Thus, the text item may be encoded as the sequence of input vectors.

The encoder module 920 may be constructed with an ERNIE-based model, which may include 12 encoders and 12 attention heads. Therefore, the input embedding module 910 can input the sequence of input vectors into a lowest-layer encoder of the encoder module 920. The encoder at each layer of the encoder module 920 can encode the sequence of input vectors using a self-attention mechanism and a feedforward neural network, and pass the encoding result to the encoder of an upper layer. Hereinafter, the structure of the encoder module 920 will be described in detail with reference to FIG. 10. As illustrated in FIG. 9, the vector output by the encoder module 920 can be classified by the classifier module 930 to obtain the classification result 940 of the text items by the example structure 900, for example, the classification result of the Key-Value entity. The classifier module 930 may include a classifier with any suitable network structure and constructed based on the ERNIE model. In addition, it is to be noted that the specific numerical value or number listed in FIG. 9 is only exemplary, and is not intended to limit the scope of the disclosure. Other numerical values or numbers can be set.

Figure 10:
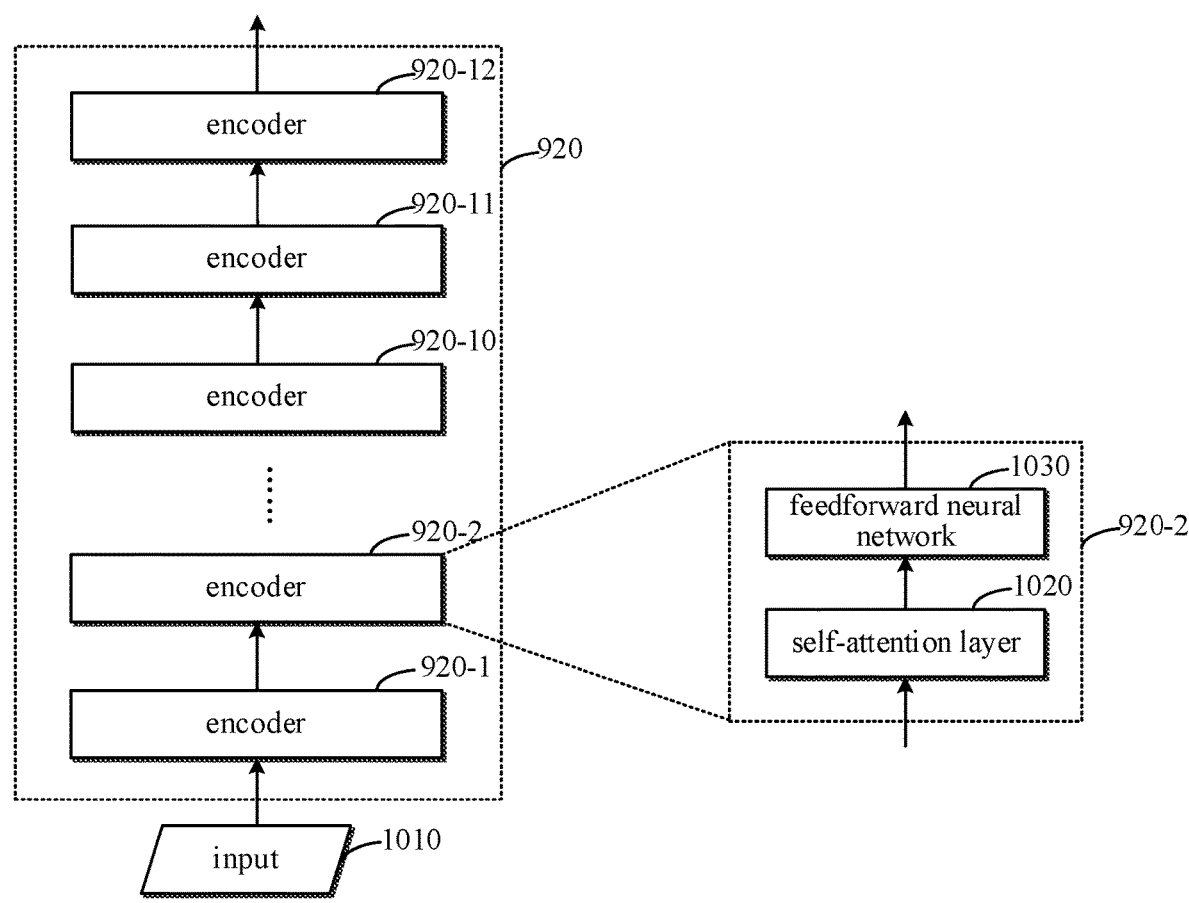
FIG. 10 is a schematic diagram illustrating an encoder module in a semantic classification model according to some embodiments of the disclosure.

FIG. 10 is a schematic diagram illustrating an example structure of an encoder module 920 in the example structure 900 of the semantic classification model 710 according to some embodiments of the disclosure. As illustrated in FIG. 10, the encoder module 920 in the example structure 900 may be formed by cascading 12 encoders 920-1 to 920-12, and each encoder may include two layers. Without loss of generality, the encoder 920-2 is taken as an example, the encoder 920-2 may include a self-attention layer 1020 and a feedforward neural network 1030. As illustrated in FIG. 10, the input 1010 may be provided to the encoder 920-1 at the lowermost layer of the encoder module 920. The input 1010 may be an input vector of a token (e.g., "Zhang" or "San").

In each self-attention layer (e.g., the self-attention layer 1020), the input vector can be multiplied by three matrices to obtain three vectors, i.e., a query vector, a Key vector, and a Value vector. While encoding a token by the self-attention layer in each encoder, a weight summation of representations (e.g., the Value vectors) of all tokens of the sentence may be obtained to obtain an output of the self-attention layer at that position, where the weight indicates a correlation between tokens. The above-mentioned correlation may be obtained through the dot product of a certain Token representation (e.g., the Key vector) and an encoded Token representation (e.g., the query vector) and through a softmax function.

The self-attention layer (e.g., the self-attention layer 1020) can be a "multi-head" attention mechanism, which can expand the ability of the model to focus on different positions to project the input Token embedding vectors (or vectors from the lower encoders) into different representation subspaces. As an example, the self-attention layer (e.g., the self-attention layer 1020) of each encoder may adopt 12 attention heads.

The self-attention layer (e.g., the self-attention layer 1020) can perform the matrix multiplication on the output matrices of multiple attention heads, obtain an output matrix through compression and fed the output matrix to the feedforward neural network layer (e.g., feedforward Neural network layer 1030). The feedforward neural network layer of each encoder (i.e., at each location) may share parameters. It is to be noted that the specific numerical value or number listed in FIG. 10 is only exemplary and is not intended to limit the scope of the disclosure. Other numerical values or numbers can be set.

As mentioned above in the block 230 of FIG. 2, for improving the accuracy of determining the matched name-content text items by the computing device 120, the computing device 120 may preset the matching condition for determining whether a name text item matches a content text item. For example, the matching condition may be determined based on experiences, the information arrangement of the image 110, and/or the positional relationship between a name text item and a content text item matching the name text item, to reduce a probability of determining a name text item and a content text item mismatching the name text item as the matched name-content text items by the computing device 120. Therefore, if a name text item and a content text item do not meet the predetermined matching condition, the computing device 120 can determine that these two text items do not match each other, thereby avoiding erroneously determining that the name text item and the content text item match each other. In this way, the efficiency and accuracy in determining the matched name-content text items by the computing device 120 can be improved. The above will be described below with reference to FIGS. 11 to 15.

Figure 11:
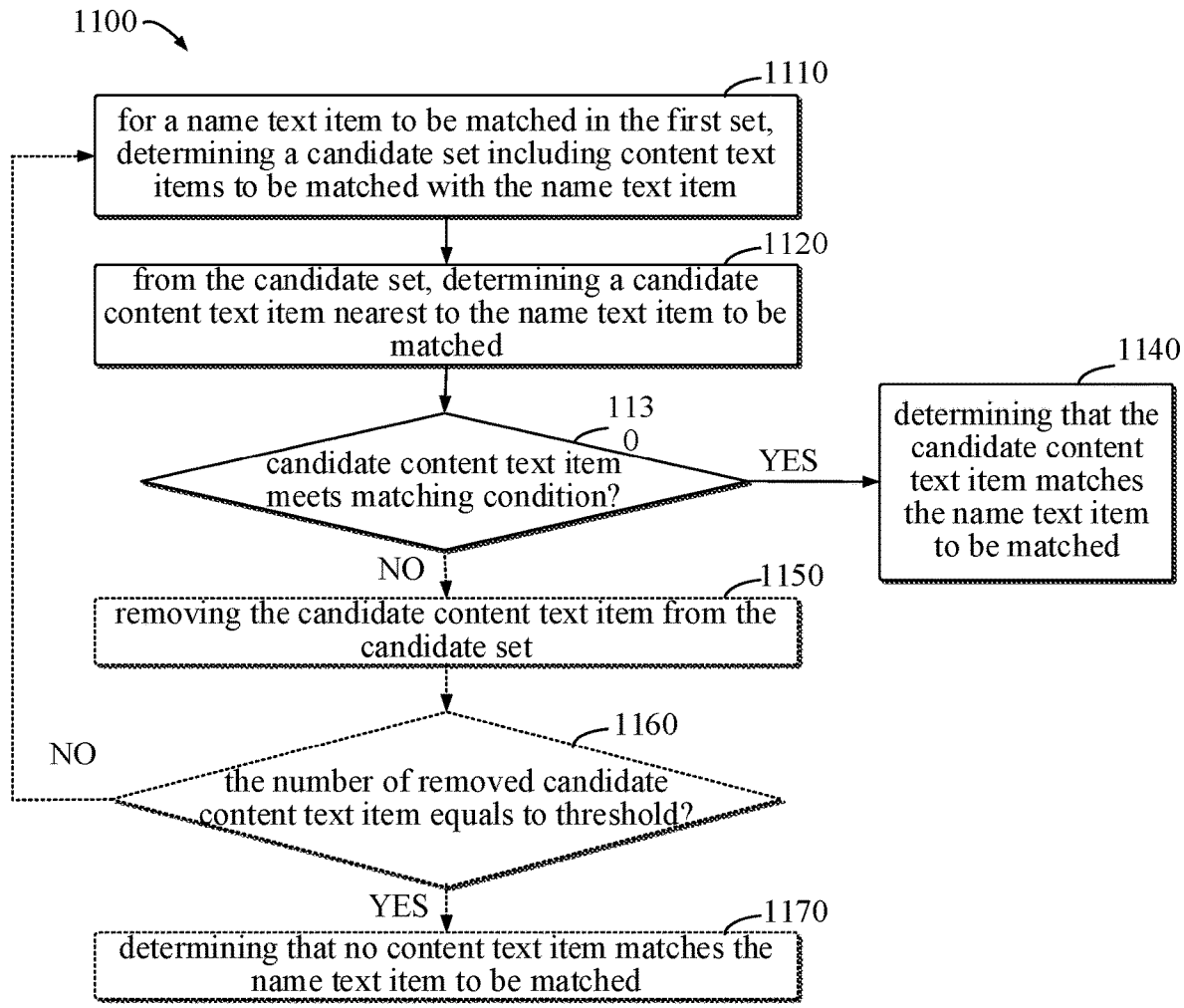
FIG. 11 is a flowchart of performing a matching operation between the first set of name text items and the second set of content text items according to some embodiments of the disclosure.

FIG. 11 is a flowchart illustrating an example process 1100 of performing a matching operation between the first set of name text items 117 and the second set of content text items 119 according to some embodiments of the disclosure. The example process 1100 may be implemented by the computing device 120 in the example environment 100. For example, the example process 1100 may be executed by a processor or processing unit of the computing device 120, or various functional modules of the computing device 120. The example process 1100 may also be executed by a computing device independent of the example environment 100, or other units or modules in the example environment 100. For ease of explanation, the example process 1100 will be described with reference to FIG. 1.

At block 1110, for a name text item to be matched and contained in the first set 117 of name text items, the computing device 120 may determine a candidate set including content text items to be matched with the name text item to be matched. In other words, for the name text item to be matched, the computing device 120 may determine the candidate set, where the content text items contained in the candidate set are possible to match the name text item to be matched, thereby excluding content text items that do not match the name text item to be matched. For example, in an initial stage of performing the matching operation between the first set 117 and the second set 119, the computing device 120 may initially determine the second set 119 as the candidate set. That is, in the initial stage, for the first name text item to be matched, the computing device 120 may determine that the candidate set includes all content text items. In this way, it may be ensured that all content text items are contained in the candidate set, avoiding missing any content text item that has a possibility to match the first name text item. For example, in the image 110, the computing device 120 may perform the matching operation between the two sets starting from the name text item 115-1 of the first set 117 (i.e., the name text item 115-1 is the first name text item to be matched). The computing device 120 may determine the entire second set 119 as the candidate set including content text items to be matched with the name text item 115-1.

It is to be noted that during the matching process for a name text item, the corresponding candidate set may be constantly changing. For example, in the image 110, after initially determining that the entire second set 119 is the candidate set for the name text item 115-1, if the computing device 120 subsequently determines that the content text item 115-2 does not match the name text item 115-1, the computing device 120 may remove the content text item 115-2 from the candidate set for the name text item 115-1. For the name text item to be matched, if the computing device 120 determines that a content text item has previously been successfully matched with another name text item, the computing device 120 may remove the content text item that has been successfully matched with another name text item from the candidate set for the name text item to be matched. For example, in the image 110, for determining the content text item matching the name text item 115-5, if the computing device 120 has determined that the content text item 115-4 matches the name text item 115-3, the computing device 120 may remove the content text item 115-4 from the candidate set including the content text items to be matched the name text item 115-5.

At block 1120, from the candidate set including content text items to be matched with the name text item to be matched, the computing device 120 may determine a candidate content text item having a nearest distance to the name text item to be matched. For example, in the image 110, when the name text item to be matched is the name text item 115-1, the computing device 120 may determine that the content text item 115-2 is the content text item nearest the name text item 115-1. When the name text item to be matched is the name text item 115-3, the computing device 120 may determine that the content text item 115-4 is the content text item nearest the name text item 115-3.

Generally, the computing device 120 may determine the distance between two text items in any suitable methods. For example, the computing device 120 may determine a center point of each text item in the image 110, and determine the distance between two center points as the distance between the two text items. The computing device 120 may also determine two nearest pixels that are respectively contained in the two text items in the image 110, and determine a distance between these two nearest pixels as the distance between the two text items. The computing device 120 may also determine two rectangular regions associated with the two text items respectively, and determine the distance between the two text items based on a distance between corner points of the two rectangular regions. The above will be described below with reference to FIGS. 13 and 14.

At block 1130, the computing device 120 may determine whether the candidate content text item nearest the name text item to be matched satisfies the matching condition. As used herein, the "matching condition" refers to a necessary condition to be satisfied by the matched name-content text items. The matching conditions may be predetermined by users, administrators, or skilled persons based on specific technical environment and application requirements. If a name text item and a content text item do not meet the predetermined matching condition, it can be considered that these two text items do not match to each other. For a name text item to be matched, multiple content text items in the candidate set may satisfy the predetermined matching condition. In this case, the computing device 120 may determine a content text item that is nearest the name text item to be matched and meets the matching condition as the content text item matching the name text item to be matched. Therefore, after determining that the candidate content text item is the content text item nearest the name text item to be matched in block 1120, the computing device 120 may further determine whether the candidate content text item satisfies the predetermined matching condition, to determine whether the candidate content text item matches the name text item to be matched.

The matching condition may include that the positional relationship between the candidate content text item and the name text item to be matched conforms to the information arrangement of the image 110. As used herein, the "information arrangement" refers to the layout of the information recorded by the image 110 on a plane of the image 110, which generally corresponds to the positional layout of most of pairs of matched name-content text items. If the textual information in the image 110 is regarded as a document, the information arrangement of the image 110 in this document can also be referred to as the document structure or the main document structure without causing ambiguity. For example, the information arrangement of the image 110 may be a left-right format, a right-left format, an up-down format, and the like.

The left-right format means that when the image 110 faces the users, the name text item and content text item matching the name text item are arranged in such a way that the name text item is on the left and the content text item is on the right. The right-left format means that when the image 110 face the users, the name text item and the content text item matching the name text item are arranged in such a way that the name text item is on the right and the content text item is on the left. The up-down format means that when the image 110 faces the users, the name text item and the content text item matching the name text item are arranged in such a way that the name text item is above the content text item. Therefore, based on above-mentioned matching condition regarding the information arrangement, the computing device 120 will not determine a name text item and a content text item whose positional relationship does not conform to the information arrangement of the image 110 as the matched name-content text items, thereby reducing the possibility of mismatching.

The computing device 120 may determine the information arrangement of the image 110 in various appropriate methods. For example, the computing device 120 may count the positional distributions of the first set 117 of name text items and the second set 119 of content text items in the image 110. When the name text items and the content text items are mainly spaced in the left-right direction, and the leftmost column is the name text item, the computing device 120 may determine that the information arrangement of the image 110 is the left-right format. When the name text items and the content text items are mainly spaced in the left-right direction, and the leftmost column is the content text item, the computing device 120 may determine that the information arrangement of the image 110 is the right-left format. When the name text items and the content text items are mainly spaced in the up-down direction, the computing device 120 may determine that the information arrangement of the image 110 is the up-down format.

Considering that the matched name-content text items in the image generally conform to the information arrangement of the image and the distance between the matched name-content text items is generally the minimum, the computing device 120 can determine the information arrangement of the image 110 based on a name text item in the first set 117 and a content text item in the second set 119, where a distance between the name text item and the content text item is the minimum. In this way, the process of determining the information arrangement of the image 110 by the computing device 120 can be simplified, thereby reducing the computing overhead of the computing device 120.

The computing device 120 may determine a pair of reference text items corresponding to a minimum distance, where the pair of reference text items includes a reference name text item in the first set 117 and a reference content text item in the second set 119. In other words, among all distances between the name text items and content text items, the distance between the reference name text item and the reference content text item is the minimum. For example, as illustrated in FIG. 1, the distance between the name text item 115-5 and the content text item 115-6 in the image 110 is the minimum among all the distances between the name text items and the content text items, the computing device 120 may determine the name text item 115-5 as the reference name text item, and the content text item 115-6 as the reference content text item.

The computing device 120 may determine the information arrangement of the image 110 based on the positional relationship between the reference name text item and the reference content text item. For example, in the example of FIG. 1, the computing device 120 may determine that the name text item 115-5 and the content text item 115-6 are approximately in the same horizontal line, and the name text item 115-5 is on the left of the content text item 115-6. Therefore, the computing device 120 can determine that the arrangement between the name text item 115-5 and the content text item 115-6 is the left-right format, and further determine that the information arrangement of the image 110 is the left-right format. In some examples, the computing device 120 may directly determine the reference name text item and the reference content text item as a first pair of matched name-content text items, and subsequently output the first pair of matched name-content text items as the name text item and the content text item matching the name text item, without determining whether they meet the matching condition.

In some cases, the positional relationship between the reference name text item and the reference content text item used to determine the information arrangement of the image 110 may not be clear or easily obtained. In this case, the computing device 120 can quantitatively determine the information arrangement of the image 110 based on an intersection angle between a reference direction and a line connecting center points of the reference name text item and the reference content text item. The above will be described below with reference to FIG. 12.

Figure 12:
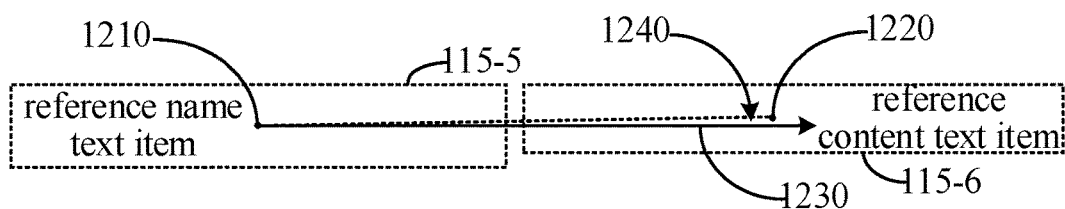
FIG. 12 is a schematic diagram illustrating an intersection angle between a reference direction and a line connecting a center point of a reference name text item and a center point of a reference content text item according to some embodiments of the disclosure.

FIG. 12 is a schematic diagram illustrating an intersection angle 1240 between a reference direction 1230 and a line connecting center points 1210-1220 of the reference name text item 115-5 and the reference content text item 115-6 according to some embodiments of the disclosure. In the example of FIG. 12, the reference name text item of the image 110 is for example the name text item 115-5 in the image 110, and the reference content text item of the image 110 is for example the content text item 115-6. It may be understood that the above is an example and is not intended to limit the scope of the disclosure. The text items in the image 110 may be arranged in another format, and thus the reference name text item may be any other name text items and the reference content text item may be any other content text items.

As illustrated in FIG. 12, in order to determine the information arrangement of the image 110, the computing device 120 may determine the center point 1210 of the reference name text item 115-5 and the center point 1220 of the reference content text item 115-6. The computing device 120 may determine the center point 1210 based on a center point of all pixels involved in the reference name text item 115-5, and determine the center point 1220 based on a center point of all pixels involved in the reference content text item 115-6. The computing device 120 may also determine the center point 1210 based on the text item region 315-5 corresponding to the reference name text item 115-5, and determine the center point 1220 based on the text item region 315-6 corresponding to the reference content text item 115-6.

After the center points 1210 and 1220 are determined, the computing device 120 may determine the intersection angle 1240 between the reference direction 1230 and the line 1210-1220 connecting the center points of the reference name text item 115-5 and the reference content text item 115-6. As used herein, the reference direction refers to a certain direction in the plane where the image 110 is located when the image 110 faces the users. In the example of FIG. 12, the reference direction 1230 may be the horizontal direction. However, it is to be noted that taking the horizontal direction as the reference direction 1230 is only an example, and is not intended to limit the scope of the disclosure. The reference direction 1230 may be any direction in the plane where the image 110 is located. The selection of the reference direction 1230 may affect the angle range used to determine the information arrangement of the image 110.

For example, when the computing device 120 determines that the intersection angle 1240 is within a first angle range, the computing device 120 may determine that the information arrangement of the image 110 is the left-right pattern. In a case where the reference direction 1230 is the horizontal direction, the first angle range may be −30° to 30°. When the computing device 120 determines that the intersection angle 1240 is within a second angle range, the computing device 120 may determine that the information arrangement of the image 110 is the up-down pattern. In a case where the reference direction 1230 is the horizontal direction, the second angle range may be 210° to 330°. When the computing device 120 determines that the intersection angle 1240 is within a third angle range, the computing device 120 may determine that the information arrangement of the image 110 is the right-left pattern. In a case where the reference direction 1230 is the horizontal direction, the third angle range may be 150° to 210°. When the computing device 120 determines that the intersection angle 1240 is not within the first, the second or the third angle range, the computing device 120 may determine that the information arrangement of the image 110 is an unknown pattern. In this way, the information arrangement of the image 110 can be determined in a quantitative manner based on the value of the intersection angle 1240, thereby improving the operability and accuracy in determining the information arrangement by the computing device 120. It will be understood that the specific angle values listed here are only exemplary, and are not intended to limit the scope of the disclosure. Each angle range described above may have any other upper and lower limited values.

In addition to the above-mentioned matching condition based on the information arrangement of the image 110, the matching condition may additionally or alternatively include that the distance between the candidate content text item and the name text item to be matched is less than a distance threshold. This means that if a text item distance between a name text item and a content text item is greater than the distance threshold, it may be determined that the name text item and the content text item do not match to each other. Therefore, the computing device 120 can avoid determining the name text item and the content text item that are far away from each other as the matched name-content text items, thereby reducing the possibility of the mismatch. The above-mentioned distance threshold may be predetermined by a user, an administrator, or a technician based on specific technical environment and application requirements. The computing device 120 may determine the above-mentioned distance threshold based on the distances between the matched name-content text items.

In a case where there have been multiple pairs of matched name-content text items, the computing device 120 may determine a distance for each pair of matched name-content text items and obtain multiple distances. The computing device 120 may determine the distance threshold based on an average value of the multiple distances. In this way, since the distance threshold is determined based on the average distance between the name text items and the content text items matching respective name text items, the rationality of the distance threshold can be improved. For example, the computing device 120 may determine 5 times of the average value of the multiple distances as the distance threshold. It is to be noted that the "5 times" mentioned here is only an example, and is not intended to limit the scope of the disclosure. The computing device 120 may directly determine the average value of the multiple distances or other appropriate multiples of the average value as the distance threshold.

In addition to the above-mentioned matching conditions based on the information arrangement and the distance threshold, the matching conditions may additionally or alternatively include that a difference between an intersection angle and a different angle is less than an angle threshold, where the intersection angle is formed between the reference direction (e.g., the reference direction 1230 in FIG. 12) and the line connecting the center points of the candidate content text item and the name text item to be matched. The intersection angle between the reference direction and the line connecting the center points of the candidate content text item and the name text item to be matched may be similarly determined with reference to the description of FIG. 12 above. This matching condition means that when the difference between the reference angle and the intersection angle associated with the name and content text items is greater than or equal to the angle threshold, it will not be considered the name text item and the content text item as the matched name-content text items. Therefore, the computing device 120 can avoid determining the name and content text items corresponding to an excessive angle difference as the matched name-content text items, thereby reducing the possibility of the mismatch. The reference angle and the angle threshold may be predetermined by the user, administrator, or technician based on specific technical environment and application requirements.

The computing device 120 may determine the reference angle based on the intersection angles associated with the matched name-content text items. In this way, since the reference angle is determined based on an average angle of multiple intersection angles, the rationality of the reference angle can be improved. In detail, when there have been multiple pairs of matched name-content text items, the computing device 120 may determine multiple intersection angles each formed between the reference direction (e.g., the reference direction 1230 in FIG. 12) and the line connecting the center points of the name text item and content text item matching the name text item. Then, the computing device 120 may determine the reference angle based on the average value of the multiple intersection angles. For example, the computing device 120 may determine an average value of multiple intersection angles as the reference angle.

As illustrated in FIG. 11, at block 1140, when the computing device 120 determines that the candidate content text item meets the matching condition, the computing device 120 may determine that the candidate content text item matches the name text item to be matched. For example, in the image 110, when the name text item to be matched is the name text item 115-3, and the candidate content text item is the content text item 115-4, the computing device 120 may determine that the content text item 115-4 satisfies the matching condition, and further the content text item 115-4 matches the name text item 115-3. As an example, in the image 110, when the name text item to be matched is the name text item 115-16 and the candidate content text item is the content text item 115-17, the computing device 120 may determine that the content text item 115-17 satisfies the matching condition and further the content text item 115-17 matches the name text item 115-16.

At block 1150, when the computing device 120 determines that the candidate content text item does not meet the matching condition, the computing device 120 may remove the candidate content text item from the candidate set including content text items to be matched with the name text item to be matched. In this way, the computing device 120 can ensure that the content text items included in the candidate set have not been determined yet whether to match the name text item, such that the matched content text items can be determined iteratively with respect to the candidate set. For example, in the image 110, when the name text item to be matched is the name text item 115-1 and the candidate content text item is the content text item 115-2, the computing device 120 may determine that the content text item 115-2 does not satisfy the matching condition, and then remove the content text item 115-2 from the candidate set including content text items to be matched with the name text item 115-1. As another example, in the image 110, when the name text item to be matched is the name text item 115-16 and the candidate content text item is the content text item 115-18, the computing device 120 may determine that the content text item 115-18 does not satisfy the matching condition, and then remove the content text item 115-18 from the candidate set including content text items to be matched with the name text item 115-16.

At block 1160, the computing device 120 may determine whether the number of removed candidate content text items is equal to or greater than a threshold. The threshold here may be predetermined by users, administrators, or technicians based on specific technical environment and application requirements. For example, the threshold may be 3. It is to be understood that the specific numerical value listed here is only exemplary, and is not intended to limit the scope of the disclosure. The threshold can be any other suitable value. In the case where the above threshold is 3, in the image 110, when the name text item to be matched is the name text item 115-1, the computing device 120 may determine that the number of removed candidate content text items is 1 after removing the content text item 115-2 from the candidate set. Since the number is not equal to or greater than the threshold 3, the computing device 120 may return to the block 1110 to determine the candidate set again for the name text item 115-1. The computing device 120 may further determine that the content text item 115-4 does not match the name text item 115-1, and then remove the content text item 115-4 from the candidate set. After removing the content text item 115-4 from the candidate set, the computing device 120 may determine that the number of removed candidate content text items is 2, which is not equal to or greater than the threshold 3. The computing device 120 may return to the block 1110 to determine the candidate set again for the name text item 115-1. As another example, in the image 110, when the name text item to be matched is the name text item 115-16 and the candidate content text item is the content text item 115-18, the computing device 120 may remove the content text item 115-18 from the candidate set. Since the number of removed candidate content text items is 1, which is not equal to or greater than the threshold 3, the computing device 120 may return to the block 1110 to determine the candidate set again for the name text items 115-16.

At block 1170, when the computing device 120 determines that the number of removed candidate content text items is equal to or greater than the threshold, the computing device 120 may determine that no content text item of the candidate set matches the name text item to be matched. This is because several content text items that are relatively close to the name text item to be matched have been determined as mismatching, and the content text items that are farther from the name text item to be matched usually do not match the name text to be matched. As a result, it can be determined in advance that there is no content text item matching the name text item to be matched in the candidate set, without determining whether each content text item in the candidate set meets the matching condition. In this way, the overhead of determining the content text items matching the name text items to be matched may be reduced for the computing device 120. In the case where the above threshold is 3, in the image 110, when the name text item to be matched is the name text item 115-1, the computing device 120 may sequentially determine that the content text items 115-2, 115-4, and 115-6 do not satisfy the matching condition, and then remove the content text items 115-2, 115-4, and 115-6 from the candidate set including content text items to be matched with the name text item 115-1. After the content text item 115-6 is removed, the computing device 120 may determine that the number of removed candidate content text items is 3, which is equal to the threshold. Therefore, the computing device 120 may determines that there is no content text item matching the name text item 115-1.

As mentioned above in the block 1120 of FIG. 11, the computing device 120 may determine two rectangular regions associated with two text items, and determines the distance between the two text items based on the distance between center points of the two rectangular areas. In this way, the efficiency and accuracy in determining the distance between the name text item and the candidate content text item by the computing device 120 can be improved. Hereinafter, the above will be described with reference to FIGS. 13 and 14.

Figure 13:
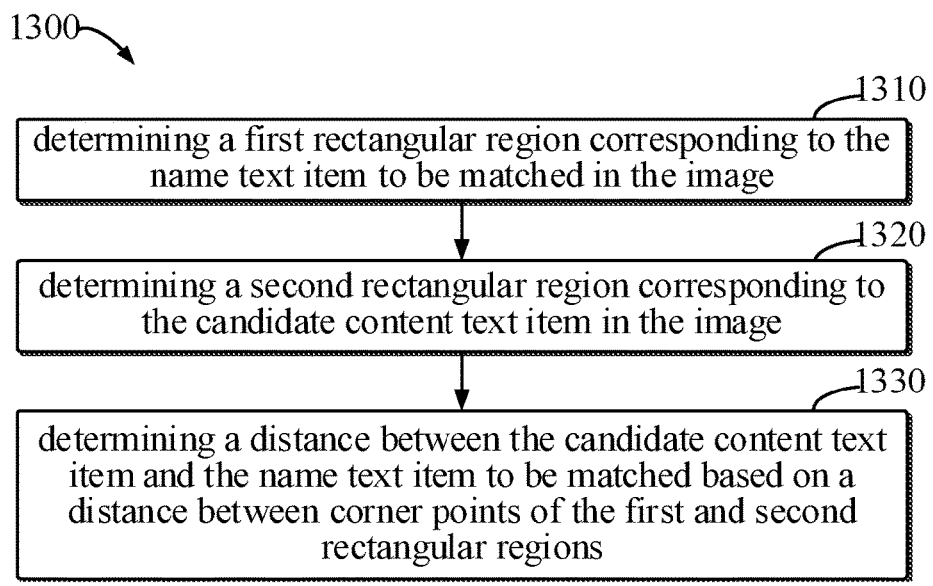
FIG. 13 is a flowchart illustrating an example process of determining a distance between a name text item to be matched and a candidate content text item according to some embodiments of the disclosure.

FIG. 13 is a flowchart illustrating an example process 1300 of determining a distance between a name text item to be matched and a candidate content text item according to some embodiments of the disclosure. The example process 1300 may be implemented by the computing device 120 in the example environment 100. For example, the example process 1300 may be executed by a processor or processing unit of the computing device 120, or various functional modules of the computing device 120. The example process 1300 may also be implemented by a computing device independent of the example environment 100, or other units or modules in the example environment 100.

Figure 14:
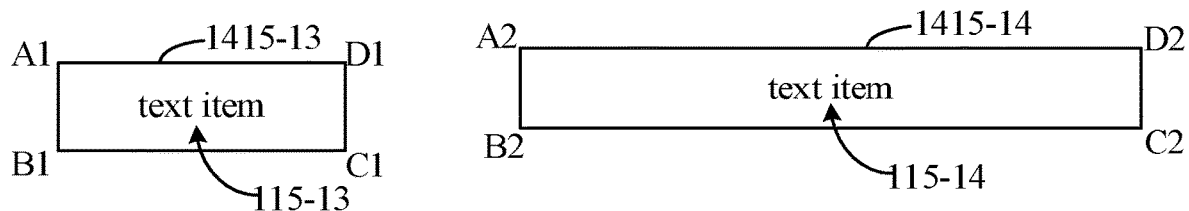
FIG. 14 is a schematic diagram illustrating a distance between two text items determined based on two rectangular regions corresponding to the two text items according to some embodiments of the disclosure.

FIG. 14 is a schematic diagram illustrating a distance between two text items determined based on two rectangular regions corresponding to the two text items according to some embodiments of the disclosure. In the example of FIG. 14, without loss of generality, the name text item 115-13 in the image 110 is an example of the name text item to be matched, and the content text item 115-14 is an example of the candidate content text item. In addition, it is to be understood that the method for determining the distance depicted in FIG. 14 can be applied to determining the distance between any two text items in the disclosure.

As illustrated in FIGS. 13 and 14, at the block 1310, the computing device 120 may determine a first rectangular region 1415-13 in the image 110 for the name text item 115-13 to be matched. In detail, the computing device 120 may detect coordinate positions of four corner points A1, B1, C1, and D1 of the first rectangular region 1415-13 in a reference coordinate system (e.g., a pixel coordinate system or an image coordinate system). When the text item region 315-13 detected by the text item detection model 310 described above in FIG. 4 is a rectangle, the computing device 120 may determine the text item region 315-13 as the first rectangular region 1415-13. When the text item region 315-13 detected by the text item detection model 310 is not a rectangle, the computing device 120 may determine the first rectangular region 1415-13 based on the pixel range where the name text item 115-13 is located in the image 110. In some examples, regardless of whether the text item region 315-13 is rectangular, the computing device 120 may additionally determine the first rectangular region 1415-13.

At block 1320, the computing device 120 may determine a second rectangular region 1415-14 in the image 110 for the candidate content text item 115-14. In detail, the computing device 120 may detect coordinate positions of four corner points A2, B2, C2, and D2 of the second rectangular region 1415-14 in a reference coordinate system (e.g., a pixel coordinate system or an image coordinate system). When the text item region 315-14 detected by the text item detection model 310 described above in FIG. 4 is a rectangle. the computing device 120 may use the text item region 315-14 as the second rectangular region 1415-14. When the text item region 315-14 detected by the text item detection model 310 is not a rectangle, the computing device 120 may determine the second rectangular region 1415-14 based on the pixel range where the name text item 115-14 is located in the image 110. In some examples, regardless of whether the text item region 315-14 is a rectangle or not, the computing device 120 may additionally determine the second rectangular region 1415-14.

At block 1330, the computing device 120 may determine a distance between the candidate content text item 115-14 and the name text item 115-13 to be matched based on the distance between corner points of the first rectangular region 1415-13 and the second rectangular region 1415-14. For example, since the size of the first rectangular region 1415-13 is quietly different from the size of the second rectangular region 1415-14, in order to accurately determine the difference between the candidate content text item 115-14 and the name text item 115-13 to be matched, the computing device 120 may determine an average value of the distances D1A2 and C1B2 between the center points as the distance between the two text items. The computing device 120 may also determine either the distance D1A2 or the distance C1B2 as the distance between two text items separately, which can reduce the computational complexity for the computing device 120.

The computing device 120 may determine the distance between two text items based on the distance between corresponding corner points of the first rectangular region 1415-13 and the second rectangular region 1415-14. In this way, when the information arrangement of the image 110 is not the left-right pattern or the right-left pattern, the computing device 120 can determine the distance between two text items reasonably. For example, the computing device 120 may use one of the distances A1A2, B1B2, C1C2, and D1D2 between the center points as the distance between two text items. The computing device 120 may also use an average value of two or more of these distances as the distance between two text items. More generally, the computing device 120 may determine the distance between two text items based on the distance between any two corner points of the first rectangular region 1415-13 and the second rectangular region 1415-14. For example, in a case where the information arrangement of the image 110 is the up-down pattern, the computing device 120 may determine the distance between two text items based on one or both distances B1A2 and C1D2.

Figure 15:
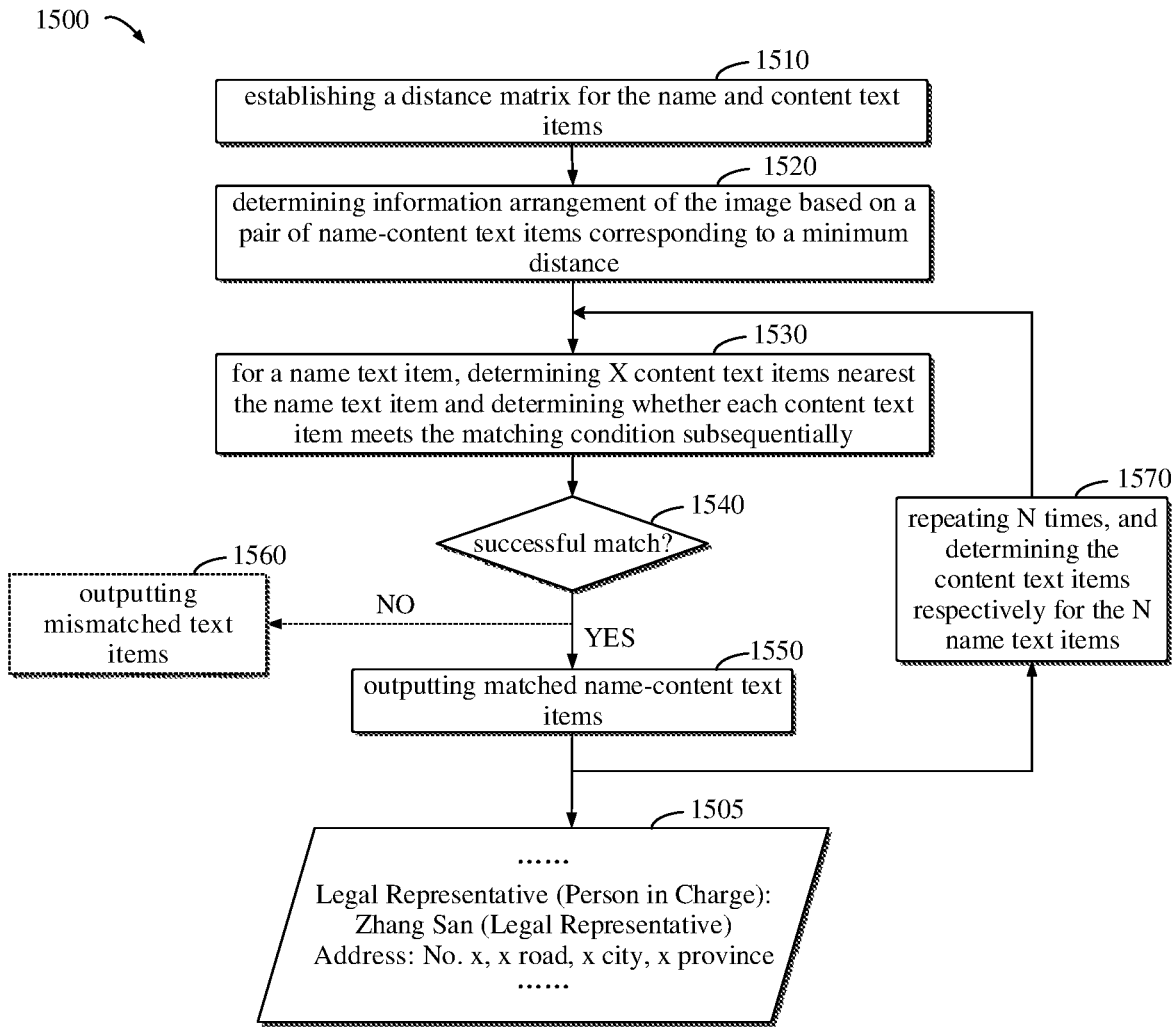
FIG. 15 is a flowchart illustrating an example process of performing local neighbor matching between a name text item and a content text item and outputting matched name-content text items, or additionally outputting a mismatched text item according to some embodiments of the disclosure.

FIG. 15 is a flowchart illustrating an example process 1500 of performing local neighbor matching between a name text item and a content text item and outputting matched name-content text items, or additionally outputting a mismatched text item according to some embodiments of the disclosure. The example process 1500 may be implemented by the computing device 120 in the example environment 100. For example, the example process 1500 is executed by a processor or processing unit of the computing device 120, or various functional modules of the computing device 120. The example process 1500 may also be implemented by a computing device independent of the example environment 100, or other units or modules in the example environment 100. For ease of explanation, the example process 1500 will be described with reference to FIG. 1.

To describe the example process 1500, it is assumed that the computing device 120 has determined N name text items 117-1 to 117-N and M content text items 119-1 to 119-M from the image 110. In the example process 1500, the computing device 120 heuristically finds the matched name-content text items (each pair of matched name-content text items includes a name text item and a content text item matching the name text item) based on a local nearest neighbor algorithm (e.g., which is a local nearest neighbor distance metric algorithm, using the spatial position relationship between the name text items and the content text items). The algorithm can support common information arrangements, such as the left-right pattern, the up-down pattern, and the right-left pattern. In the context of the disclosure, the example process 1500 may also be referred to as performing the matching operation between the name text items and content text items (e.g., key-value matching) based on the local nearest distance metric.

At block 1510, the computing device 120 may establish a distance matrix $D_{NM}$ for the N name text items 117-1 to 117-N and the M content text items 119-1 to 119-M, where N is the number of the name text items and M is the number of the content text items. The distance between the name text item and the content text item can be determined in the manner described above, and will not be repeated here. For example, because the size of the rectangle of the name text item may be quietly different from the size of the rectangle of the content text item, the distance between the text items can be obtained based on the distance between the upper right corner of rectangle of the name text item and the upper left corner of rectangle of the content text item and the distance between the lower right corner of rectangle of the name text item and the lower left corner of rectangle of the content text item. Therefore, in the image 100 of Food and Beverage Service License, the input used to build the distance matrix $D_{NM}$ can be as follows: the name text item: . . . , "Legal Representative (Person In Charge), {x1, y1, x2, y2}", "Address, {x1', y1', x2', y2'}" . . . ; the content text items: . . . , "Zhang San (Legal Representative), {x1″, y1″, x2″, y2″}", "No. x, x road, x city, x province, a certain city, {x1‴, y1‴, x2‴, y2‴}" . . . , where {x1, y1, x2, y2} and {x1', y1', x2', y2'} represent the coordinates of the upper right corner and the lower right corner of the rectangle of each name text item, and {x1″, y1″, x2″, y2″} and {x1‴, y1‴, x2‴, y2‴} represent the coordinates of the upper-left corner and the lower-left corner of the rectangle of each content text item.

At block 1520, the computing device 120 may determine the information arrangement of the image 110 based on a pair of name-content text items corresponding to the minimum distance. For the manner of determining the information arrangement of the image 110, reference may be made to the above description of FIGS. 11 and 12, which is not repeated herein. At block 1530, the computing device 120 may determine X nearest content text items for a name text item, and determine whether each nearest content text item meets the matching condition in an order of distance. For example, the matching condition may include that the positional relationship between the content text item and the name text item is consistent with the information arrangement of the image 110. Certainly, the matching conditions may also include conditions related to the distance and the intersection angle, which may be referred to the above descriptions, and not repeated here.

When the computing device 120 has determined a name text item and a content text item between which the distance is the minimum as the matched name-content text items, the computing device 120 may perform the matching operation on the remaining (N−1) name text items. In details, the computing device 120 may repeat the following process until all name text items are traversed: each time when a minimum value $D_{i,j}$ in the distance matrix $D_{NM}$ is found, where i∈[0, 1, . . . , N−1], j∈[1, 2, . . . , M−1] (i.e., the distance between the $i^{th}$ name text item and the $j^{th}$ content text item is the minimum), it is determined whether the name text item and the content text item meet the matching condition. In some cases, since multiple content text items may be relatively close to each other, the computing device 120 can find X (e.g., 3) content text items that are closest to the name text item, and determine sequentially whether the name text item and the X content text items meet the matching condition.

At block 1540, the computing device 120 may determine whether the match of the name text item is successful, i.e., whether a content text item matching the name text item is found. At block 1550, when there is a content text item meeting the matching condition among the X content text items, it is determined that the match of the name text item is successful. If the content text item matching the name text item is found, the computing device 120 may output the matched name-content text items, i.e., the name text item and the content text item matching the name text item. The computing device 120 may set the row where the name text item of which the matching content text item has been found is located of the distance matrix $D_{NM}$ as the infinity. At block 1560, if the X content text items fail to match the name text item, the computing device 120 may determine that no content text item matches the name text item. In the case that no matching content text item is found, the computing device 120 may optionally output the name text item and content text item mismatching the name text item. At block 1570, the computing device 120 may repeat the matching operation N times on the N name text items 117-1 to 117-N to determine the content text items matching the respective N name text items 117-1 to 117-N.

As illustrated in the block 1505 representing the output in FIG. 15, after the content text item matching each of the N name text items 117-1 to 117-N is determined, or after it is determined that no content text item matches the N name text items 117-1 to 117-N, the computing device 120 may output the name text item and the content text item matching the name text item. In the example of FIG. 15, the output 1505 may be sequentially listed matched name-content text items (the name text item and the content text item matching the name text item) in the form of text. For example, in the image 110 of Food and Beverage Service License, the output 1505 may include the Legal Representative (Person in Charge): Zhang San (Legal Representative); Address: No. x, x road, x city, x province, etc. As mentioned above in the block 240 of FIG. 2, the computing device 120 may also output the name text items and the corresponding content text items matching the name text items in the form of a graphical representation. In this way, the computing device 120 can more intuitively present the matching relationship between the name text items and the corresponding content text items to the user. Hereinafter, the above will be described with reference to FIG. 16.

Figure 16:
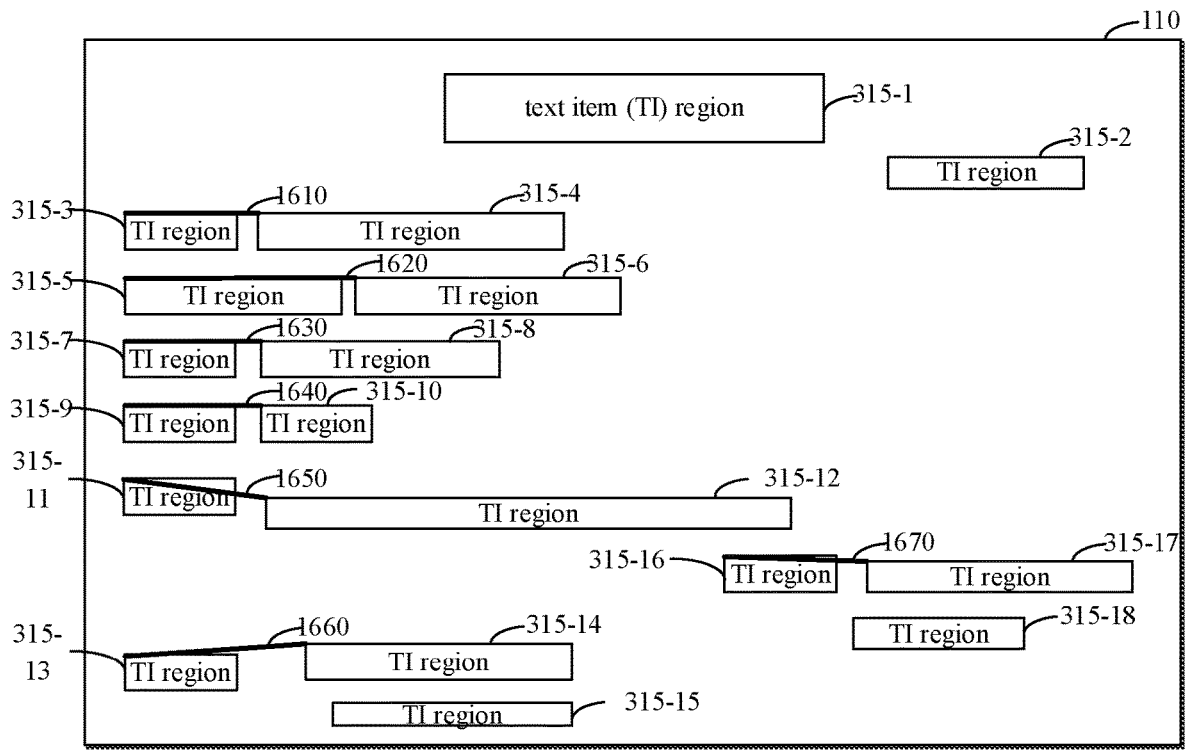
FIG. 16 is a schematic diagram illustrating a graphical representation for indicating a matching relationship between a name text item and a content text item according to some embodiments of the disclosure.

FIG. 16 is a schematic diagram illustrating a graphical representation for indicating a matching relationship between a name text item and a content text item according to some embodiments of the disclosure. As illustrated in FIG. 16, the computing device 120 may output a marked image 110, in which the first set 117 of name text items and the second set 119 of content text items may be marked with marking boxes of different colors or shapes, respectively. In detail, the computing device 120 may mark all name text items in the image with blue or rectangular marking boxes and all content text items in the image with red or oval marking boxes. It is to be noted that the colors and shapes listed here are only examples, and are not intended to limit the scope of the disclosure. The computing device 120 may mark the first set 117 and the second set 119 with any distinguishable colors, shapes, or other features.

In the example of FIG. 16, the text item regions 315-1 to 315-18 may be used as the marking boxes of the text items 115-1 to 115-18. In this way, for outputting the marked image 110, the computing device 120 can reuse the text item regions 315-1 to 315-18 detected in order to recognize the text items 115-1 to 115-18, thereby avoiding additional marking operation for the computing device 120 and saving the cost for the computing device 120. Certainly, the computing device 120 may additionally display the marking boxes of the text items 115-1 to 115-18 for the purpose of outputting the marked image 110.

In the output manner depicted in FIG. 16, the computing device 120 may output a graphical representation indicating the matching relationship between the name text items and the content text items. For example, the computing device 120 may use a connecting line 1610 between the upper left corner points of the text item region 315-3 and the text item region 315-4 to indicate the matching relationship between the name text item 115-3 and the content text item 115-4. Similarly, the computing device 120 may use the connecting line 1620 to indicate the matching relationship between the name text item 115-5 and the content text item 115-6, use the connecting line 1630 to indicate the matching relationship between the name text item 115-7 and the content text item 115-8, use the connecting line 1640 to indicate the matching relationship between the name text item 115-9 and the content text item 115-10, use the connection line 1650 can be marked to indicate the match between the name text item 115-11 and the content text item 115-12, use the connecting line 1660 to indicate the matching relationship between the name text item 115-13 and the content text item 115-14, and use the connecting line 1670 to indicate the matching relationship between the name text item 115-16 and the content text item 115-17.

Compared with the marking boxes of the name text items and the marking boxes of the content text item, the connecting lines 1610 to 1670 may have a different color (e.g., green) to highlight the matching relationship between the text items, the connecting lines 1610 to 1670 may be thicker to highlight the matching relationship between the text items. It is to be understood that the connecting lines 1610 to 1670 for indicating the matching relationship depicted in FIG. 16 are only examples, and are not intended to limit the scope of the disclosure.

The computing device 120 may also use any other graphical representation to indicate the matching relationship between the name text items and the content text items. For example, the connecting line used to indicate the matching relationship can connect other positions of the marking boxes of the name text item and the content text item, the connecting line can be a curve or in other formats, and other color and thickness may also be set for the connecting line. More generally, the computing device 120 may display any graphical representation that can indicate the matching relationship of the text items in the output image.

Figure 17:
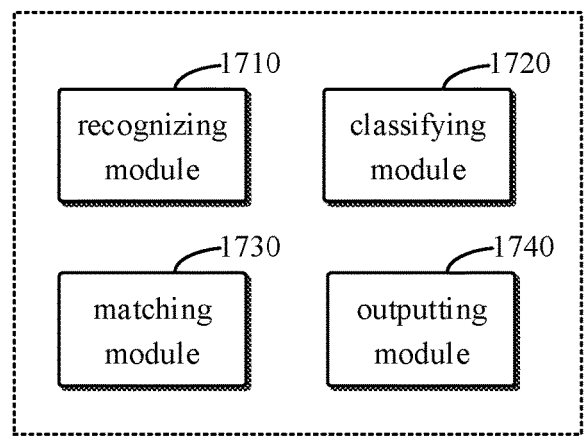
FIG. 17 is a block diagram illustrating a device for processing information according to some embodiments of the disclosure.

FIG. 17 is a block diagram illustrating an example device 1700 for processing information according to some embodiments of the disclosure. The device 1700 may be included in the computing device 120 of FIG. 1 or implemented as the computing device 120.

As illustrated in FIG. 17, the device 1700 may include a recognizing module 1710, a classifying module 1720, a matching module 1730, and an outputting module 1740. The recognizing module 1710 is configured to recognize multiple text items in the image. The classifying module 1720 is configured to classify the multiple text items into a first set of name text items and a second set of content text items based on the semantics of the multiple text items. The matching module 1730 is configured to perform a matching operation between the first set and the second set based on a layout of the multiple text items in the image and determine matched name-content text items including a name text item in the first set and a content text item matching the name text item and in the second set. The outputting module 1740 is configured to output the matched name-content text items.

The recognizing module 1710 includes a text item detecting module and a text item recognizing module. The text item detecting module is configured to detect multiple text item regions from the image based on a text item detection model. The text item recognizing module is configured to recognize multiple text items from multiple text item regions based on a text recognition model.

The text item detection model is constructed by performing incremental learning of an initial text item detection model based on specific data. The initial text item detection model is trained using general data, and the specific data includes annotated name text items and annotated content text items.

The classifying module 1720 includes a text item type determining module. The text item type determining module is configured to determine whether each of the multiple text items is a name text item or a content text item based on a semantic classification model.

The semantic classification model is constructed by performing incremental learning of an initial semantic classification model based on special data. The initial semantic classification model is trained using general data, and the special data includes annotated name text items and annotated content text items.

The matching module 1730 includes a candidate set determining module, a candidate content text item determining module, and a match determining module. The candidate set determining module is configured to determine a candidate set including content text items to be matched with the name text item to be matched in the first set. The candidate content text item determining module is configured to determine a candidate content text item nearest the name text item to be matched from the candidate set. The matching determining module is configured to determine that the candidate content text item satisfying a matching condition matches the name text item to be matched.

The device 1700 further includes a removing module. The removing module is configured to remove the candidate content text item unsatisfying the matching condition from the candidate set.

The device 1700 further includes a match terminating module. The match terminating module is configured to determine that no content text item matches the name text item to be matched when the number of removed content text items from the candidate set equals to a threshold.

The candidate set determining module includes an initial candidate set determining module. The initial candidate set determining module is configured to initially determine the second set as the candidate set.

The matching condition includes at least one of: a positional relationship between the candidate content text item and the name text item to be matched conforming to the information arrangement of the image, a distance between the candidate content text item and the name to be matched being less than a distance threshold, or a difference between a reference angle and an intersection angle between a reference direction and a line connecting center points of the candidate content text item and the name text item to be matched being less than an angle threshold.

The device 1700 further includes a reference text item determining module and an information arrangement determining module. The reference text item determining module is configured to determine a pair of reference text items corresponding to a minimum distance, where the pair of reference text items includes a reference name text item in the first set and a reference content text item in the second set. The information arrangement determining module is configured to determine the information arrangement based on the positional relationship between the reference name text item and the reference content text item.

The information arrangement determining module includes an intersection angle determining module, a left-right pattern determining module, an up-down pattern determining module, and a right-left pattern determining module. The intersection angle determining module is configured to determine an intersection angle between the reference direction and the line connecting center points of the reference name text item and the reference content text item. The left-right pattern determining module is configured to determine that the information arrangement is a left-right pattern based on the intersection angle being within a first angle range. The up-down pattern determining module is configured to determine that the information arrangement is an up-down pattern based on the intersection angle being within a second angle range. The right-left pattern determining module is configured to determine that the information arrangement is a right-left pattern based on the intersection angle being within the third angle range.

The device 1700 further includes a distance between matched text items determining module and a distance threshold determining module. The distance between matched text items determining module is configured to determine distances between pairs of matched name-content text items. The distance threshold determining module is configured to determine the distance threshold based on an average value of the distances.

The device 1700 further includes an intersection angle of matched text items determining module and a reference angle determining module. The intersection angle of matched text items determining module is configured to determine intersection angles between the reference direction and the lines connecting the center points of the matched name-content text items. The reference angle determining module is configured to determine the reference angle based on the average value of the intersection angles.

The device 1700 further includes a first rectangular region determining module, a second rectangular region determining module, and a distance determining module. The first rectangular region determining module is configured to determine a first rectangular region corresponding to the name text item to be matched in the image. The second rectangular region determining module is configured to determine a second rectangular region corresponding to the candidate content text item in the image. The distance determining module is configured to determine the distance between the candidate content text item and the name text item to be matched based on a distance between corner points of the first rectangular region and the second rectangular region.

The outputting module 1740 includes a graphical representation outputting module. The graphical representation outputting module is configured to output a graphical representation indicating a matching relationship between the name text items and the content text items.

Figure 18:
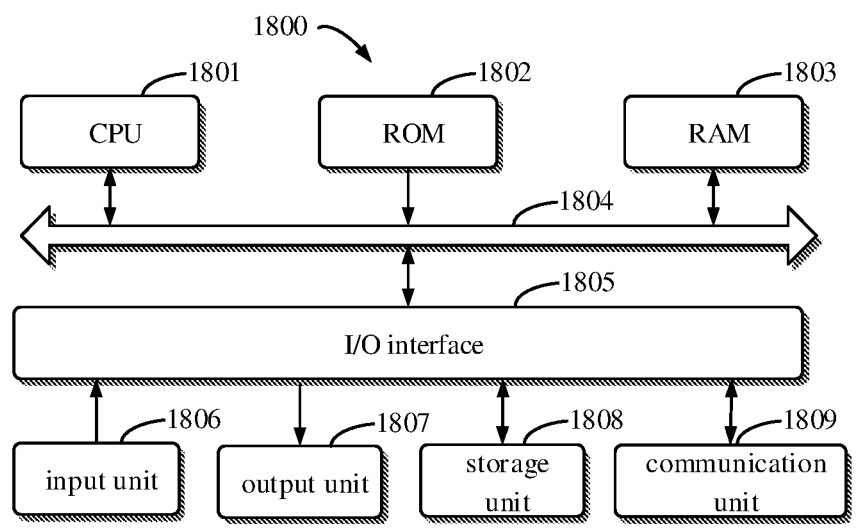
FIG. 18 is a block diagram illustrating an electronic device for implementing embodiments of the disclosure.

FIG. 18 is a block diagram illustrating an example electronic device 1800 that can be used to implement embodiments of the disclosure. As illustrated in FIG. 18, the electronic device 1800 includes a central processing unit (CPU) 1801, which can perform various appropriate actions and processing based on computer program instructions stored in a read-only storage device (ROM) 1802 or computer program instructions loaded to a random-access storage device (RAM) from the storage unit 1808. Various programs and data required for the operation of the device 1800 can also be stored in the RAM 1803. The CPU 1801, ROM 1802, and RAM 1803 are connected to each other through a bus 1804. An input/output (I/O) interface 1805 is also connected to the bus 1804.

Multiple components in the electronic device 1800 are connected to the I/O interface 1805, including an input unit 1806, such as a keyboard and a mouse, an output unit 1807, such as various types of displays and speakers, a storage unit 1808, such as a magnetic disk and an optical disk, and a communication unit 1809, such as a network card, a modem, and a wireless communication transceiver. The communication unit 1809 allows the electronic device 1800 to exchange information/data with other devices through a computer network such as the Internet and/or various telecommunication networks.

The various processes and processes described above, for example, the example processes 200, 1100, 1300, 1500 may be executed by the processing unit 1801. For example, the example processes 200, 1100, 1300, 1500 may be implemented as a computer software program, which is tangibly contained in a machine-readable medium, such as the storage unit 1808. Part or all of the computer program may be loaded and/or installed on the electronic device 1800 via the ROM 1802 and/or the communication unit 1809. When the computer program is loaded into the RAM 1803 and executed by the CPU 1801, one or more block of the example processes 200, 1100, 1300, 1500 described above may be executed.

As used herein, the term "including" and similar terms should be understood as open-ended inclusion, that is, "including but not limited to". The term "based on" should be understood as "based at least in part on". The term "one embodiment" or "the embodiment" should be understood as "at least one embodiment". The terms "first", "second", may refer to different or the same objects. The disclosure may also include other explicit and implicit definitions.

As used herein, the term "determine" encompasses a wide variety of actions. For example, "determining" may include computing, calculation, processing, deriving, investigating, searching (for example, searching a table, database, or another data structure), ascertaining, and so on. In addition, "determining" may include receiving (for example, receiving information), accessing (for example, accessing data in a memory), and the like. In addition, "determining" may include analyzing, selecting, choosing, establishing, and so on.

It is to be noted that the disclosure can be implemented by hardware, software, or a combination thereof. The hardware part can be implemented using dedicated logic, and the software part can be stored in a memory and executed by an appropriate instruction execution system, such as a microprocessor or dedicated design hardware. Those skilled in the art can understand that the above-mentioned devices and methods can be implemented using computer-executable instructions and/or included in processor control codes, for example, such codes are provided on a programmable memory or a data carrier such as an optical or electronic signal carrier.

In addition, although the operations of the method of the disclosure are described in a specific order in the drawings, this does not require or imply that these operations must be performed in the specific order, or that all the operations shown must be performed to achieve the desired the result of. Rather, the steps depicted in the flowchart can change the order of execution. Some steps may be omitted, multiple steps may be combined into one step for execution, and/or one step may be decomposed into multiple steps for execution. It is also to be noted that the features and functions of two or more devices according to the disclosure may be embodied in one device. Conversely, the features and functions of one device described above can be further divided into multiple devices to be embodied.

Although the disclosure has been described with reference to several specific embodiments, it is to be understood that the disclosure is not limited to the specific embodiments disclosed. The disclosure is intended to cover various modifications and equivalent arrangements included within the spirit and scope of the appended claims.

What is claimed is:

1. A method for processing information, including:
   recognizing text items in an image through an optical character recognition (OCR) technology or through a text recognition model based on a convolutional neural network;
   classifying the text items into a first set of name text items and a second set of content text items based on semantics of the text items;
   performing a matching operation between the first set and the second set based on a layout of the text items in the image, and determining matched name-content text items, wherein the matched name-content text items comprise a name text item in the first set and a content text item matching the name text item and in the second set; and
   outputting the matched name-content text items;
   wherein performing the matching operation between the first set and the second set comprises:
   determining a candidate set comprising content text items to be matched with a name text item to be matched in the first set;
   determining a candidate content text item nearest the name text item to be matched from the candidate set; and
   determining that the candidate content text item satisfying a matching condition matches the name text item to be matched;

wherein the matching condition comprises at least one of:
a positional relationship between the candidate content text item and the name text item to be matched conforming to an information arrangement of the image;
a distance between the candidate content text item and the name text item to be matched being less than a distance threshold; or
a difference between a reference angle and an intersection angle between a reference direction and a line connecting center points of the candidate content text item and the name text item to be matched being less than an angle threshold.

2. The method of claim 1, wherein recognizing the text items in the image comprises:
detecting text item regions in the image based on a text item detection model; and
recognizing the text items from the text item regions based on a text recognition model.

3. The method of claim 2, wherein the text item detection model is constructed by performing incremental learning of an initial text item detection model based on specific data, the initial text item detection model is trained using general data, and the specific data includes annotated name text items and annotated content text items.

4. The method of claim 1, wherein classifying the text items into the first set and the second set comprises:
determining whether each text item is a name text item or a content text item based on a semantic classification model.

5. The method of claim 1, further comprising:
removing the candidate content text item unsatisfying the matching condition from the candidate set.

6. The method of claim 5, further comprising:
determining that no content text item matches the name text item to be matched based on the number of removed content text items from the candidate set being equal to a threshold.

7. The method of claim 1, further comprising:
determining a pair of reference text items corresponding to a minimum distance, wherein the pair of reference text items comprises a reference name text item in the first set and a reference content text item in the second set; and
determining the information arrangement of the image based on a positional relationship between the reference name text item and the reference content text item.

8. The method of claim 7, wherein determining the information arrangement comprises:
determining an intersection angle between a reference direction and a line connecting center points of the reference name text item and the reference content text item;
determining the information arrangement as a left-right pattern based on the intersection angle being within a first angle range;
determining the information arrangement as an up-down pattern based on the intersection angle being within a second angle range; and
determining the information arrangement as a right-left pattern based on the intersection angle being within a third angle range.

9. The method of claim 1, further comprising at least one of:
determining distances of pairs of matched name-content text items and determining the distance threshold based on an average value of the distances; or
determining intersection angles between the reference direction and lines connecting the center points of pairs of matched name-content text items, and determining the reference angle based on an average value of the intersection angles.

10. The method of claim 1, further comprising:
determining a first rectangular region corresponding to the name text item to be matched in the image;
determining a second rectangular region corresponding to the candidate content text item in the image; and
determining the distance between the candidate content text item and the name text item to be matched based on a distance between corner points of the first rectangular region and the second rectangular region.

11. An electronic device, comprising:
at least one processor; and
a memory communicatively coupled to the at least one processor;
wherein the memory is configured to store instructions executable by the at least one processor, when the instructions are executed by the at least one processor, the at least one processor is configured to:
recognize text items in an image through an optical character recognition (OCR) technology or through a text recognition model based on a convolutional neural network;
classify the text items into a first set of name text items and a second set of content text items based on semantics of the text items;
perform a matching operation between the first set and the second set based on a layout of the text items in the image, and determine matched name-content text items, wherein the matched name-content text items comprise a name text item in the first set and a content text item matching the name text item and in the second set; and
output the matched name-content text items;
wherein the at least one processor is further configured to:
determine a candidate set comprising content text items to be matched with a name text item to be matched in the first set;
determine a candidate content text item nearest the name text item to be matched from the candidate set; and
determine that the candidate content text item satisfying a matching condition matches the name text item to be matched;
wherein the matching condition comprises at least one of:
a positional relationship between the candidate content text item and the name text item to be matched conforming to an information arrangement of the image;
a distance between the candidate content text item and the name text item to be matched being less than a distance threshold; or
a difference between a reference angle and an intersection angle between a reference direction and a line connecting center points of the candidate content text item and the name text item to be matched being less than an angle threshold.

12. The electronic device of claim 11, wherein the at least one processor is further configured to:
detect text item regions in the image based on a text item detection model; and
recognize the text items from the text item regions based on a text recognition model.

13. The electronic device of claim 11, wherein the at least one processor is further configured to:
determine whether each text item is a name text item or a content text item based on a semantic classification model.

14. The electronic device of claim 13, wherein the at least one processor is further configured to:
determine a first rectangular region corresponding to the name text item to be matched in the image;
determine a second rectangular region corresponding to the candidate content text item in the image; and
determine the distance between the candidate content text item and the name text item to be matched based on a distance between corner points of the first rectangular region and the second rectangular region.

15. The electronic device of claim 11, wherein the at least one processor is further configured to:
determine a pair of reference text items corresponding to a minimum distance, wherein the pair of reference text items comprises a reference name text item in the first set and a reference content text item in the second set; and
determine the information arrangement of the image based on a positional relationship between the reference name text item and the reference content text item.

16. A non-transitory computer-readable storage medium, having computer instructions stored thereon, wherein the computer instructions are configured to cause a computer to execute a method for processing information, the method comprising:
recognizing text items in an image through an optical character recognition (OCR) technology or through a text recognition model based on a convolutional neural network;
classifying the text items into a first set of name text items and a second set of content text items based on semantics of the text items;
performing a matching operation between the first set and the second set based on a layout of the text items in the image, and determining matched name-content text items, wherein the matched name-content text items comprise a name text item in the first set and a content text item matching the name text item and in the second set; and
outputting the matched name-content text items;
wherein performing the matching operation between the first set and the second set comprises:
determining a candidate set comprising content text items to be matched with a name text item to be matched in the first set;
determining a candidate content text item nearest the name text item to be matched from the candidate set; and
determining that the candidate content text item satisfying a matching condition matches the name text item to be matched;
wherein the matching condition comprises at least one of:
a positional relationship between the candidate content text item and the name text item to be matched conforming to an information arrangement of the image;
a distance between the candidate content text item and the name text item to be matched being less than a distance threshold; or
a difference between a reference angle and an intersection angle between a reference direction and a line connecting center points of the candidate content text item and the name text item to be matched being less than an angle threshold.

* * * * *